US012101605B2

(12) United States Patent
Waller, Jr. et al.

(10) Patent No.: US 12,101,605 B2
(45) Date of Patent: Sep. 24, 2024

(54) ADAPTIVE HEARING NORMALIZATION AND CORRECTION SYSTEM WITH AUTOMATIC TUNING

(71) Applicant: Ear Physics, LLC, Clarkston, MI (US)

(72) Inventors: James K. Waller, Jr., Clarkston, MI (US); Jon J. Waller, Waterford, MI (US)

(73) Assignee: Ear Physics, LLC, Clarkston, MI (US)

(*) Notice: Subject to any disclaimer, the term of this patent is extended or adjusted under 35 U.S.C. 154(b) by 163 days.

(21) Appl. No.: 17/766,488

(22) PCT Filed: Oct. 5, 2020

(86) PCT No.: PCT/US2020/054252
§ 371 (c)(1),
(2) Date: Apr. 4, 2022

(87) PCT Pub. No.: WO2021/067931
PCT Pub. Date: Apr. 8, 2021

(65) Prior Publication Data

US 2023/0262402 A1 Aug. 17, 2023

Related U.S. Application Data

(60) Provisional application No. 62/911,241, filed on Oct. 5, 2019.

(51) Int. Cl.
*H04R 25/00* (2006.01)
*H04R 3/00* (2006.01)
*H04R 3/04* (2006.01)

(52) U.S. Cl.
CPC ........... *H04R 25/70* (2013.01); *H04R 25/356* (2013.01); *H04R 25/505* (2013.01); *H04R 3/04* (2013.01)

(58) Field of Classification Search
CPC . H04R 3/00; H04R 3/04; H04R 3/005; H04R 3/12; H04R 3/14; H04R 25/50;
(Continued)

(56) References Cited

U.S. PATENT DOCUMENTS 6,731,767 B1 * 5/2004 Blamey ................ H04R 25/356 381/316
7,181,034 B2 * 2/2007 Armstrong ........... H04R 25/407 381/318

(Continued)

OTHER PUBLICATIONS

Banerjee, "The Compression Handbook, An overview of the Characteristics and applications fo compression amplification—Third Addition", url:https://starkeypro.com/pdfs/compression_handbook.pdf, Jan. 1, 2011, pp. 5, 6, 17-19, 23, 29, Publisher: Starkey Hearing Research & Technology.

(Continued)

*Primary Examiner* — Thang V Tran
(74) *Attorney, Agent, or Firm* — GableGotwals

(57) ABSTRACT

A hearing normalization and correction system and process provides accurate correction for users with mild to moderate hearing loss by using actual measured hearing response at multiple sound pressure levels. User measured hearing data is collected at considerably higher resolution and accuracy at multiple sound pressure levels and is automatically converted to multiple accurate correction responses. Dynamic adaptive cross-fade response correction is used to deliver hearing normalization at varying sound pressure levels. Adaptive release response allows the hearing normalization system to accurately track the envelope of the incoming audio signal providing greatly enhanced accuracy and transparency. Adaptive headroom control is also applied to increase both input and output headroom providing professional dynamic range performance. The hearing normalization and correction system delivers audio fidelity and per-
(Continued)

formance transcending that of normal hearing aid technology.

10 Claims, 18 Drawing Sheets

(58) Field of Classification Search
CPC .... H04R 25/505; H04R 25/356; H04R 25/70; H04R 2430/03
See application file for complete search history.

(56) References Cited

U.S. PATENT DOCUMENTS

| | | | | |
|---|---|---|---|---|
| 7,715,571 | B2 | 5/2010 | Boretzki et al. | |
| 10,048,930 | B1 * | 8/2018 | Vega | H04R 27/00 |
| 10,524,082 | B1 * | 12/2019 | Carroll | H04R 5/04 |
| 2002/0057808 | A1 * | 5/2002 | Goldstein | H04R 25/356 381/104 |
| 2010/0303249 | A1 * | 12/2010 | Semcken | G10L 21/02 381/103 |
| 2012/0099741 | A1 * | 4/2012 | Gotoh | H03G 9/18 381/119 |
| 2018/0349093 | A1 * | 12/2018 | McCarty | G10L 13/033 |
| 2020/0143790 | A1 * | 5/2020 | Trivedi | H04R 3/00 |

OTHER PUBLICATIONS

Strope et al., “A Novel Structure to Compensate for Frequency-dependent Lousness Recruitment of Sensorineural Hearing Loss”, Speech Processing Laboratory, , pp. 3539-3542, vol. 5, Publisher: Electrical Engineering Department, UCLA; 1995.

Keidser et al., “Siemens Expert Series: NAL-NL2-Principles, Background Data, and Comparison to Other Procedures”, Oct. 22, 2012, Publisher: AudiologyOnline.

* cited by examiner

ADAPTIVE HEARING NORMALIZATION AND CORRECTION SYSTEM WITH AUTOMATIC TUNING

CROSS-REFERENCE TO RELATED APPLICATIONS

This United States application is the National Phase of PCT Application No. PCT/US2020/054252 filed 5 Oct. 2020 which claims priority to U.S. Provisional Application No. 62/911,241 filed 5 Oct. 2019, each of which is incorporated herein by reference.

BACKGROUND OF THE INVENTION

This invention relates generally to hearing correction devices and processes and more particularly concerns hearing normalization and correction for users with mild or moderate hearing loss.

Hearing loss can occur at any age and many people over the age of 18 begin to experience some deterioration in their hearing response. Tolerance of loss or deterioration may vary depending upon personal interests and occupations, with musicians being perhaps least tolerant. Those with hearing loss all share a common desire to restore their hearing to normal, considered to be a 0 dB threshold of hearing.

The parameters of normal hearing have been well documented and known for many years. But state-of-the-art hearing aids fall far short of the ability to restore the normal frequency range and intensity of hearing with any level of precision. Unfortunately, despite modern digital technology, design and performance remains generally directed to frequencies between 250 Hz and 8000 Hz and focused primarily on the frequency spectrum of speech.

The typical sound pressure level of speech increases in noisier environments like a restaurant or other public setting. And equal-loudness contours, dating back almost a century, show that normal hearing has natural changes in frequency response based on changes in sound pressure levels. In reality, all sounds heard in the real world have harmonic structure associated with fundamental frequency components.

The typical adjustment method used for digital hearing aids is to do an initial tune based on an audiogram taken at the threshold of hearing. Then the audiologist will use the hearing aid testing program and plays with the software settings until the user is comfortable. In many cases numerous visits are required to get a comfortable and acceptable tuning.

But the measured threshold data made with pure tones does not accurately reflect low level hearing for a person with hearing impairment and the additional adjustments for higher levels are arbitrary guesswork. The end result does not represent a normal hearing response at any listening level.

The presently known best effort is an adaptive hearing aid which changes settings based on input sound pressure levels by dividing the audio spectrum into multiple, typically nine or more, frequency bands and then applying dynamic range compression in each band. There are numerous problems associated with this multiband compression approach.

First, compression threshold settings are selected based on a guesswork assumption as to when compression needs to start. Hearing response changes with spectral content and the data used for tuning is based on pure tones. Typical compressor threshold settings are at 65 db which means gain reduction will not start until the input sound pressure level is above 65 db. Incorrect frequency gain is the cause of common user complaints of unnatural sound and very poor fidelity. Second, the frequency relationship of phonetic spectral energy in speech is greatly altered. Serious audible artifacts are associated with both compressor gain overshoot, which occurs with sudden loud signals, and the following release time required to return to the low sound pressure levels gain setting. Prior art implementations have had to make a selection between fast acting compression and slow acting compression with a number of tradeoffs based on either selection. Third, the release time causes problems in hearing soft input signals that come immediately after loud input signals. Decreasing the release time in multiple frequency bands will result in increased distortion artifacts which will further reduce speech clarity and overall sound quality for the user.

In sum, known hearing aid systems take threshold measurements using only pure tones which do not accurately reflect how we hear real world sounds. They take actual measurements only at low level threshold of hearing. They are tuned by arbitrary listening. They have severe artifacts including overshoot, spectral modulation and poor release tracking. They produce unnatural and thin sound with poor overall fidelity. And they provide inadequate headroom due to low battery voltage.

It is, therefore, an object of the invention to provide a hearing normalization and correction system which affords hearing correction suited to the audio-quality demands of music industry professionals. Accordingly, it is also an object of the invention to provide a hearing normalization and correction system which affords accurate hearing correction. Yet another object of the invention is to provide a hearing normalization and correction system which affords an improved frequency response and dynamic range. And it is an object of the invention to provide a hearing normalization and correction system which accurately reflect real world sounds. It is another object of the invention to provide a hearing normalization and correction system which is capable of accurately measuring the actual hearing response of a user. A further object of the invention is to provide a hearing normalization and correction system with which users can self-test and measure their own actual hearing response. It is also an object of the invention to provide a hearing normalization and correction system which is capable of dynamic hearing correction without audible artifacts. And it is an object of the invention to provide a hearing normalization and correction system capable of converting and applying accurate measured data to enable automatic self-tuning of hearing correction responses.

SUMMARY OF THE INVENTION

In accordance with the invention, there is provided a hearing normalization and correction system for delivering to the ears of a user of an acoustical device an accurate hearing response to an input audio signal and for customized automatic tuning for the user of the device.

In the hearing normalization and correction process, the audio input signal is modified by a first correction response based on the actual hearing response of the user at a first sound pressure level to produce a first correction level response. The audio input signal is also modified by a second correction response based on the actual hearing response of the user at a second sound pressure level higher than the first to produce a second correction level response. The first correction level response is applied to the output signal of the acoustical device when the input sound pressure is at the first sound pressure level. The second correction level response is applied to the output signal of the acoustical device when the input sound pressure is at the second sound pressure level. When the input sound pressure is between the first and second sound pressure levels, the output signal is dynamically varied between the first and second correction level responses in correlation with the varying sound pressure level of the input audio signal. The second sound pressure level of the input audio signal may be the normal conversational speech level of hearing.

The audio input signal may also be modified by a third correction response based on the actual hearing response of the user at a third sound pressure level higher than the second to produce a third correction level response, in which case the third correction level response is applied to the output signal of the acoustical device when the input sound pressure is at the third sound pressure level and, when the input sound pressure is between the second and third sound pressure levels, the output signal may be dynamically varied between the second and third correction level responses in correlation with the varying sound pressure level of the input audio signal.

The audio input signal may be further modified by additional correction level responses based on the actual hearing responses of the user at additional corresponding sound pressure levels sequentially increasingly higher than the third to produce additional corresponding correction level responses. Each additional corresponding correction level response may then be applied to the output signal of the acoustical device when the input sound pressure is at the additional corresponding sound pressure level. When the input sound pressure is between additional corresponding sequential sound pressure levels, the output signal may be dynamically varied in correlation with the varying sound pressure level of the input audio signal.

Whatever the number of correction level and additional correction level responses may be, the audio spectrum may be divided into multiple frequency bands and the process repeated for each of the multiple frequency bands.

Modifying any correction response may be accomplished by measuring the corresponding actual hearing response of the user at the corresponding sound pressure level of the input audio signal and converting the measured actual hearing response into the corresponding correction level response.

In the hearing normalization and correction processor, a first converter receives the audio input signal and produces a digital output signal. A detector modifies the digital output signal to produce a control signal corresponding to the sound pressure level of the audio input signal. A first filter modifies the digital output signal to produce a first correction equalization signal corresponding to an actual measured first low level hearing response of the user. A second filter modifies the digital output signal to produce a second correction equalization signal corresponding to an actual measured second higher level hearing response of the user. A first multiplier dynamically varies the gain of the first correction equalization signal to provide a first maximum gain output signal when a corresponding detected sound pressure level is low. A second multiplier dynamically varies the gain of the second correction equalization signal to provide a second maximum gain output signal when a corresponding detected sound pressure level is high. A summer combines the first and second maximum gain output signals when the detected sound pressure level is between the high and low detected sound pressure levels.

In the tuning process, to provide an accurate low level hearing correction response, a shaped noise with a center frequency at critical frequency points is applied to an ear of a user to determine an actual low sound pressure level hearing response of the user. The determined actual low sound pressure level hearing response is converted into a low level correction response. The low level correction response is applied to the output of the acoustical device. To provide an accurate higher level hearing correction response, the tuning process further applies broadband masking noise at another sound pressure level higher than the low sound pressure level to the ear of the user and a narrow band stimulus with a center frequency at critical frequency points to the ear of the user to determine an actual higher level hearing response of the user. The determined actual higher level hearing response of the user is converted into a higher level correction response. The higher level correction response is then applied to the output of the acoustical device.

In the tuning process for providing an accurate speech level hearing correction response for a user, broadband masking noise at a speech sound pressure level is applied to the ear of the user. Narrow band stimulus with a center frequency at critical frequency points is applied to the ear of the user to determine an actual speech sound pressure level hearing response of the user. The determined actual speech sound pressure level hearing response of the user is converted into a speech sound pressure level hearing correction response. The speech sound pressure level hearing correction response is then applied to the output of the acoustical device.

In the automatic tuning process, a shaped noise with a center frequency at a set of selected frequency points is applied to the ear of the user to produce a shaped-noise set of frequency point data at an actual shaped-noise sound level hearing response of the user. A broadband masking noise is also applied to the ear of the user. A narrow band stimulus with a center frequency at a set of selected stimulus frequency points is applied to the ear of the user to produce a set of stimulus frequency point data at an actual stimulus level hearing response of the user. The shaped-noise and stimulus sets of frequency point data are stored in the memory of a digital processor. A command transmitted to the digital processor causes the digital processor to use the stored frequency point data to calculate noise level and stimulus level hearing correction responses and to use the noise level and stimulus level hearing correction responses to determine filter coefficients enabling the digital processor to provide accurate noise level and stimulus level hearing correction response curves.

BRIEF DESCRIPTION OF THE DRAWINGS

Other objects and advantages of the invention will become apparent upon reading the following detailed description and upon reference to the drawings in which.

While the invention will be described in connection with preferred embodiments thereof, it will be understood that it is not intended to limit the invention to those embodiments or to the details of the construction or arrangement of parts illustrated in the accompanying drawings.

DETAILED DESCRIPTION

Hearing is the sensorial perception of sounds by the physiological mechanisms of the human ear. Sound input is perceived as pitch, loudness and direction based on its frequency and on its arrival-time difference to the ears. From this input we can detect musical quality, spatial information and even nuances of voiced emotion.

Pitch is the perception of frequency and is not greatly affected by other physical quantities such as intensity. Normal human hearing encompasses frequencies from 20 to 20,000 Hz. Spatial cues in sound typically come from the higher frequency information and in order to determine directivity require hearing this higher frequency information with both ears.

Loudness is the perception of intensity or sound pressure level. The ear is remarkably sensitive to low-intensity sounds. The lowest audible intensity, or threshold, is commonly referred to as 0 dB hearing level. Sounds as much as $10^{12}$ more intense can be briefly tolerated. At any given frequency, it is possible to discern differences of less than 1 dB and changes of 3 dB are very easily noticed.

Frequency does also have a major effect on perceived loudness. The ear has its maximum sensitivity to frequencies in the range of 2000 to 5000 Hz, so sounds in this range are perceived as being louder than, for example, those at 500 or 10,000 Hz, even if they all have the same intensity. And sounds near the high and low frequency extremes of the hearing range seem even less loud, because the ear is even less sensitive at those frequencies.

Figure 1:
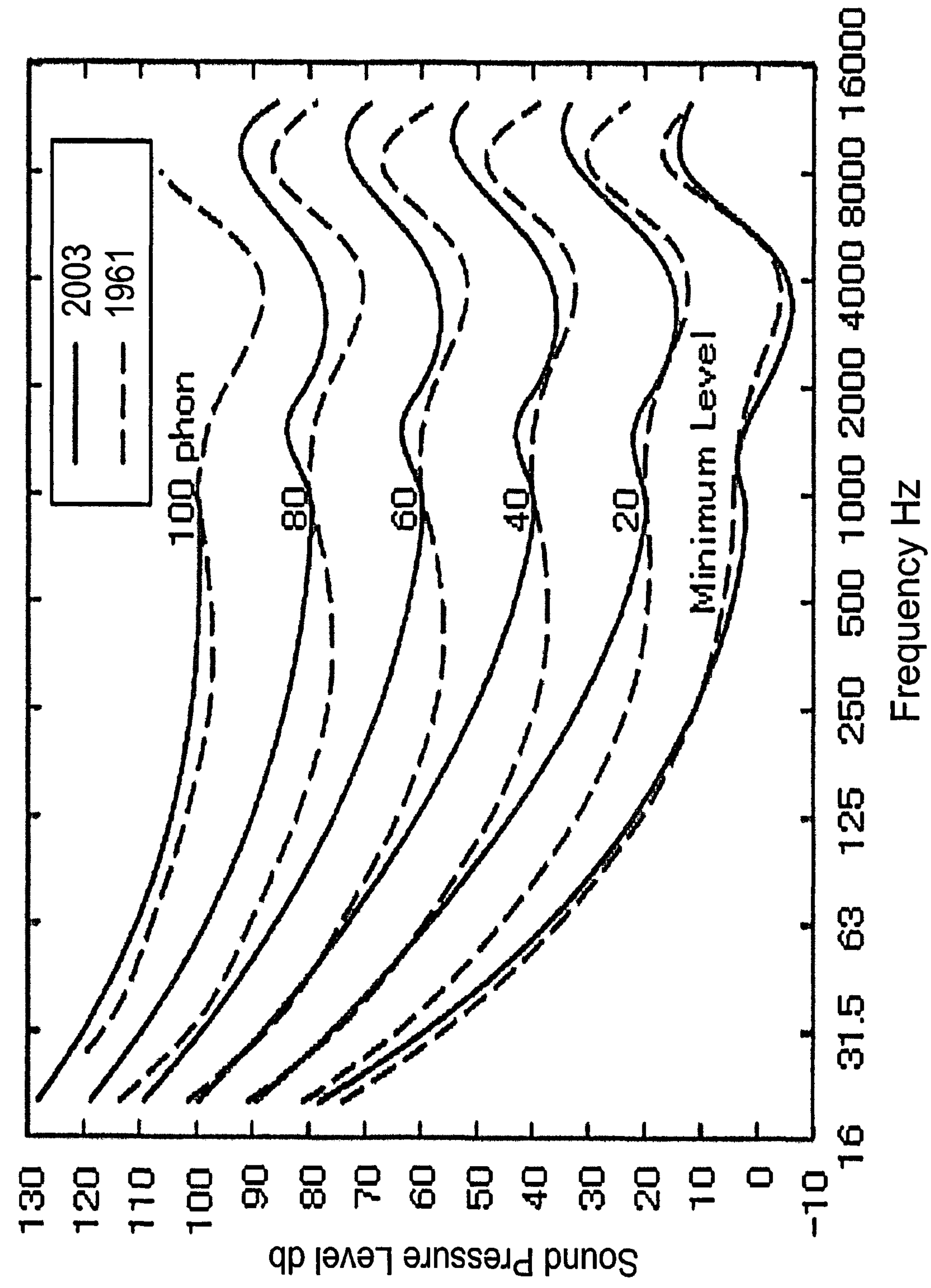
FIGURE 1 (prior art)
FIG. 1 is a prior art spectral plot of equal-loudness-level contours.

Looking at FIG. 1, Fletcher-Munson Curves, generally called Equal Loudness Contours, were originally published in 1933. They graphically illustrated normal hearing response. The curves were eventually adopted by the International Organization for Standardization as ISO 226:1961 and were later revised as ISO 226:2003. The equal-loudness contours represent a frequency characteristic of the sensitivity of the human auditory system. They connect sound pressure points that sound identically loud for different frequencies, presenting an equal sensation contour in the sound pressure-level and frequency plane. They demonstrate two fundamental characteristics of auditory sense, that the sensitivity of the human ear to pick-up sound across different frequencies varies drastically and that the frequency response of hearing changes with sound pressure level.

Figure 2:
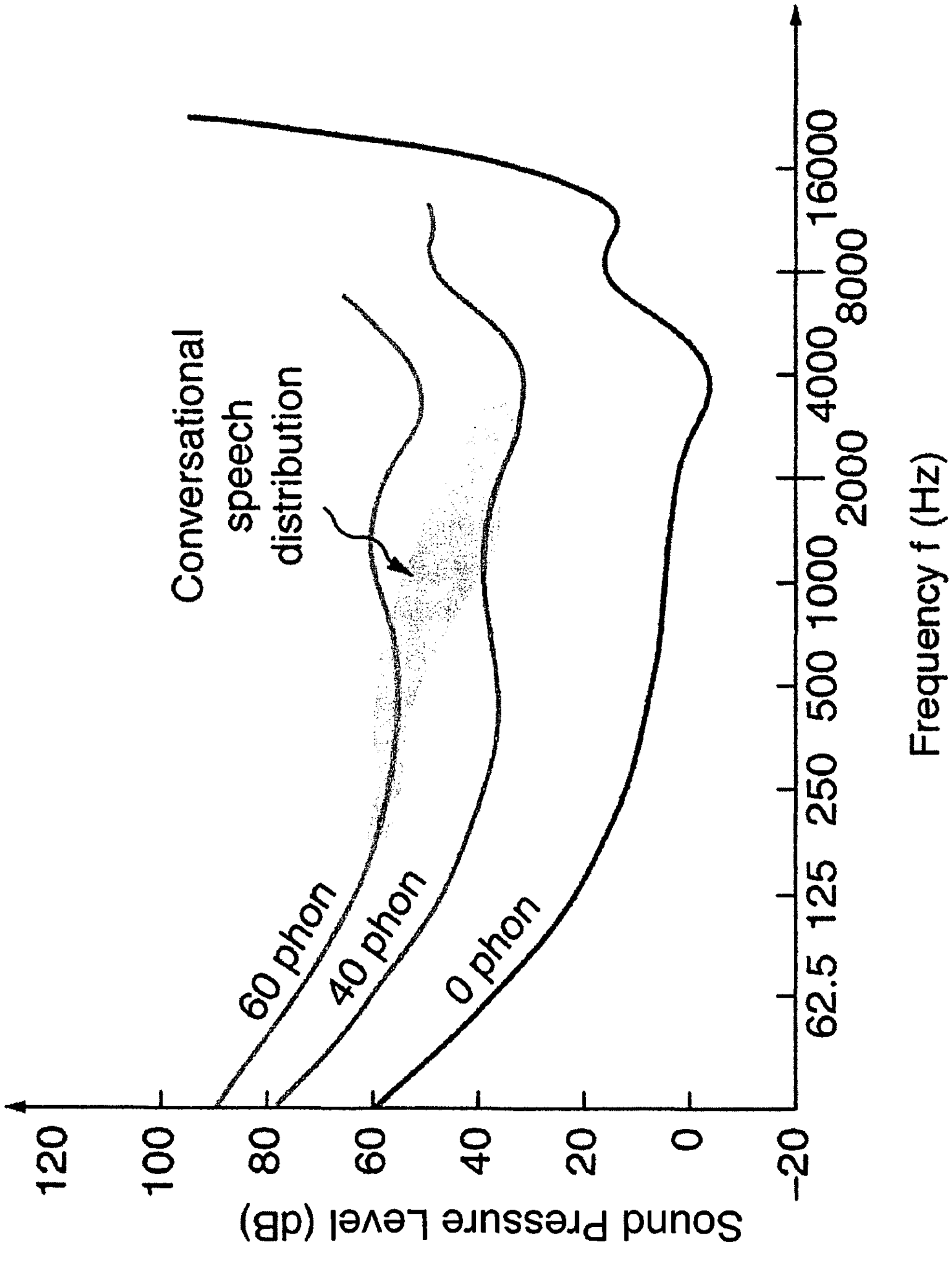
FIGURE 2 (prior art)
FIG. 2 is a prior art spectral plot of equal-loudness-level contours with the distribution of conversational speech superimposed thereon.

Speech intelligibility is most critical for those with hearing impairment and has been the main focus of hearing aids for years. FIG. 2 superimposes the typical distribution of conversational speech on the equal-loudness contours of 0, 40 and 60 phon, the phon being a unit of loudness perception, whereas the decibel is a unit of physical intensity. FIG. 2 illustrates that typical conversational speech falls between 40 db and 65 db SPL, that the higher frequency speech components have a lower SPL level than the lower frequency speech components and an that accurate hearing response at 60 db is particularly critical for speech intelligibility. Nevertheless, known hearing aids consistently and incorrectly rely on measured hearing loss and a frequency boost at the softest level of hearing, typically referred to as the "threshold of hearing," as an appropriate base-line for an accurate correction at typical speech levels. That a response measured at the threshold of hearing might even be close to an actual measured response at 60 db SPL, the typical level of conversational speech, is a matter of speculation.

Figure 3:
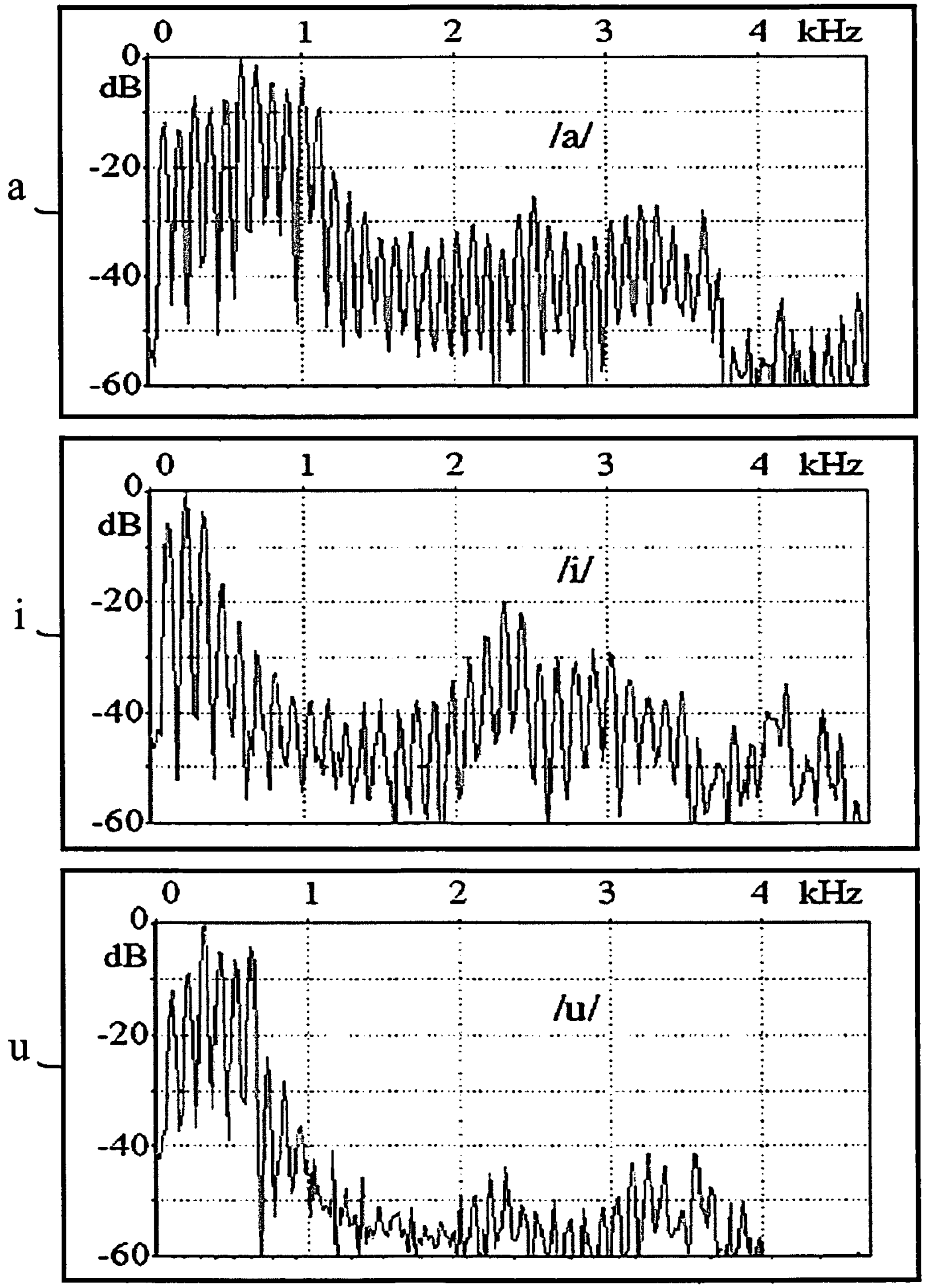
FIGURE 3 (prior art)
FIG. 3 is a comparison of prior art plots of broadband sound levels associated with specific English language vowels.

Moving on to FIG. 3, comparative plots of the spectral distribution of the unique sounds of three vowels in English speech show that each vowel, /a/, /i/ or /u/, has a different spectral energy distribution across a large portion of the audio spectrum. In the preceding sentence alone, these vowels appear 34 times. These plots illustrate a need to preserve the spectral distribution of the incoming audio. Known methods of measuring and the associated attempts at correction using pure tone measurements fall far short of accurate hearing restoration or meaningful increase in speech intelligibility.

Figure 4:
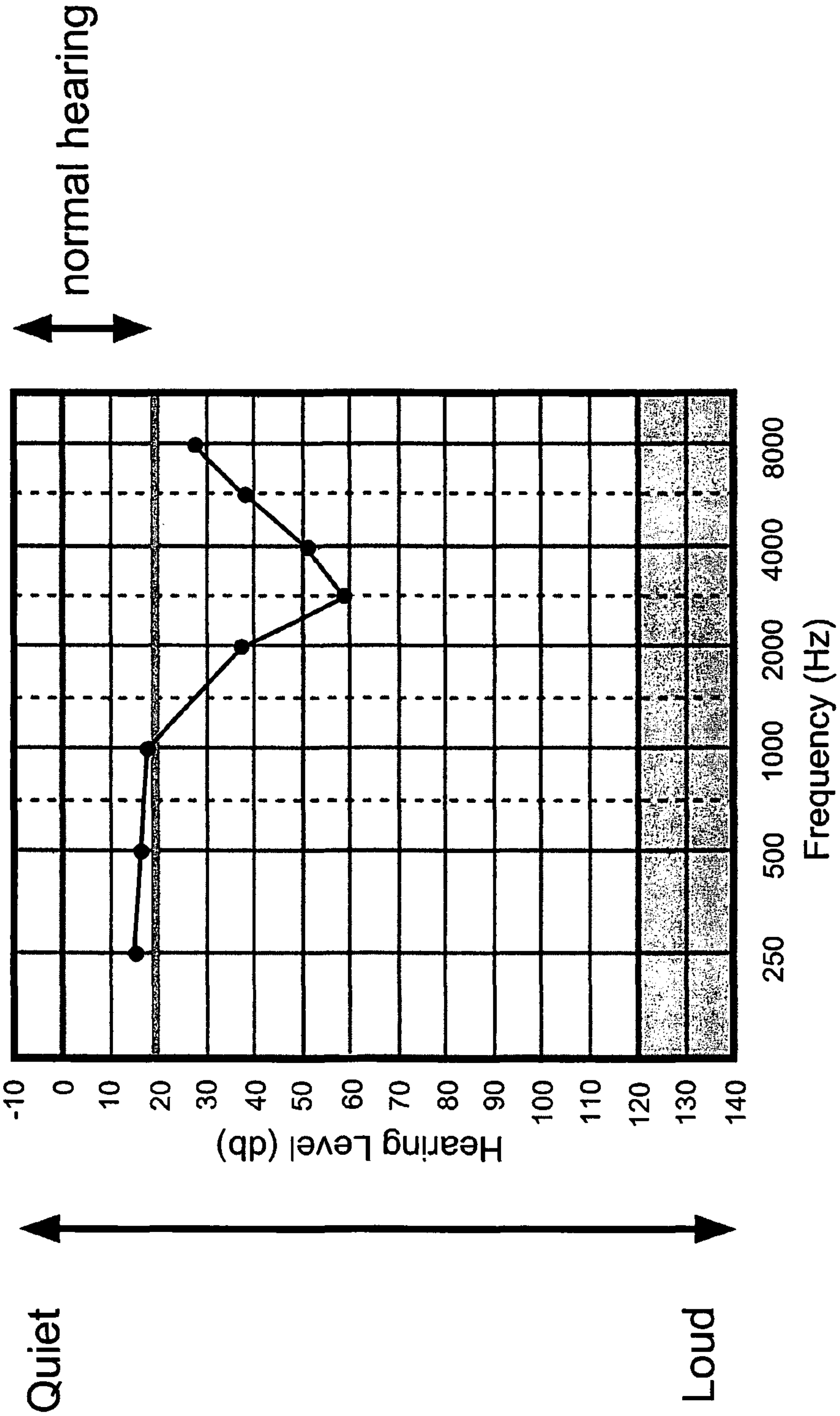
FIGURE 4 (prior art)
FIG. 4 is a prior art spectral audiogram representative of mild to moderate hearing loss of a specific user.

FIG. 4 is an audiogram representative of the known methods for testing a user's hearing and fitting the user's hearing aid. It plots the relationship of vibration frequency and minimum sound intensity or hearing level and shows the audible threshold at standardized frequencies. The audiogram is weighted based on the equal-loudness contours at the threshold of hearing so as to produce a relatively flat plot when the user has what is considered to be normal hearing. The audiogram depicts the range of measurements considered to be normal threshold hearing at the Quiet end and extremely loud levels at the Loud end of the hearing level range. The threshold of hearing is plotted relative to a standardized curve that represents "normal" Hearing Level. As shown, the standard audiogram reflects measurements at one octave intervals of 250 Hz, 500 Hz, 1000 Hz, 2000 Hz, 4000 Hz and 8000 Hz.

The most sensitive frequency region of normal hearing at all sound pressure levels is approximately 3 khz. The audiogram of FIG. 4 is illustrative of what would be considered mild to moderate hearing loss, especially at 3 khz. It shows normal hearing at 250 Hz, 500 Hz and 1000 Hz, a 20 db loss at 2000 Hz, a 40 db loss at 3000 Hz and a 10 db loss at 8000 hz. Typically, this audiogram would be used to determine the corrective frequency response to be applied to a hearing aid so as to provide boost at the frequencies where there is a measured loss. But adding the typical boost with known fitting of hearing aids will result in extremely unnatural sounding audio for the user.

Figure 5:
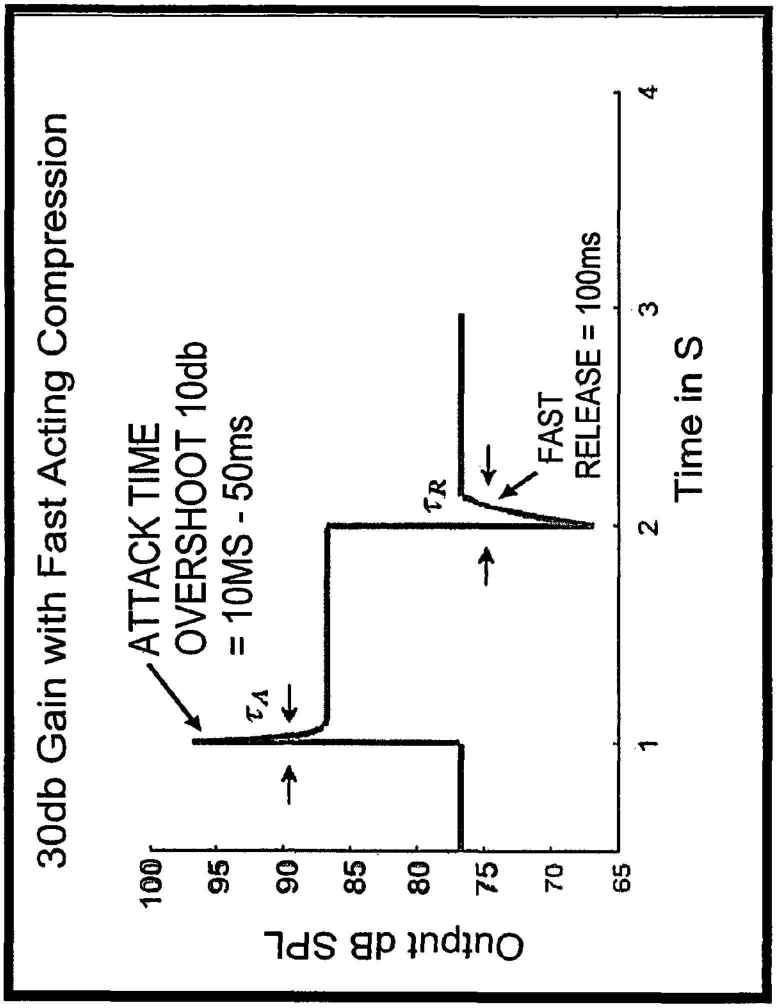
FIGURE 5 (PRIOR ART)
FIG. 5 illustrates the fast acting compression response of a prior art multiband compression system.
Figure 6:
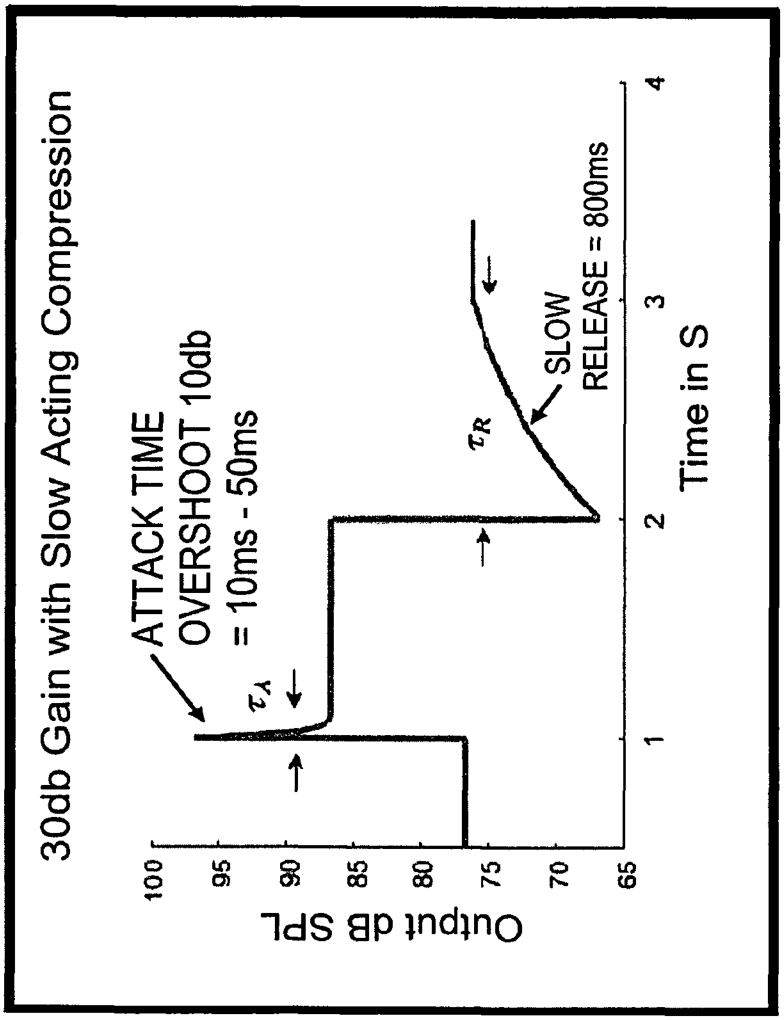
FIGURE 6 (PRIOR ART)
FIG. 6 is illustrates the slow acting compression response of the prior art multiband compression system of FIG. 5.

Known multiband compression systems have severe artifacts including overshoot, spectral modulation and poor release tracking. FIGS. 5 and 6 illustrate a recently proposed technique for enabling hearing aids to make use of multiband compression providing release times adaptive between the fast and slow settings. But adaptive release times do not solve the problem of audible artifacts and multiband compression contributes to the problem of spectral changes and unnatural sound, a least in part due to different compression ratios in each band and gain overshoot in each band.

Looking at FIG. 5, the fast acting compression response shows attack time overshoot of 10 db for a time period between 10 ms and 50 ms. This is extremely audible since every 6 db increase in sound pressure level is perceived as being twice as loud. The 10 db of overshoot shown is based on 30 db of gain in the compressor and the amount of overshoot will increase with increases in required gain in each band. The typical fast release shown is 100 ms. While this fast release response will track the audio signal faster than the 800 ms seen in the slow acting compression of FIG. 6, even a 100 ms release time is still too slow to accurately hear low level signals that immediately follow loud signals.

The attack and release problems identified with respect to FIGS. 5 and 6 are serious side effects of multiple band compression. Additionally, the settings for compression threshold, ratio and makeup gain do not correlate to any actual measured hearing response. This technique is not conducive to accurate hearing correction.

In accordance with the invention, a hearing normalization and correction system is provided that delivers an accurate hearing response to the ear of a user of an acoustical device. The system relies on more meaningful and accurate measurement methods in order to provide the user with a dynamic response which can provide very natural sound.

Shaped Noise Stimulus

Threshold measurements taken using only pure tones do not accurately reflect how real world sounds are heard. As discussed in relation to FIG. 3, even a single vowel sound in speech has a large spectral balance. Therefore, a more meaningful and accurate measurement can be derived by using broader spectrum stimulus.

Figure 7:
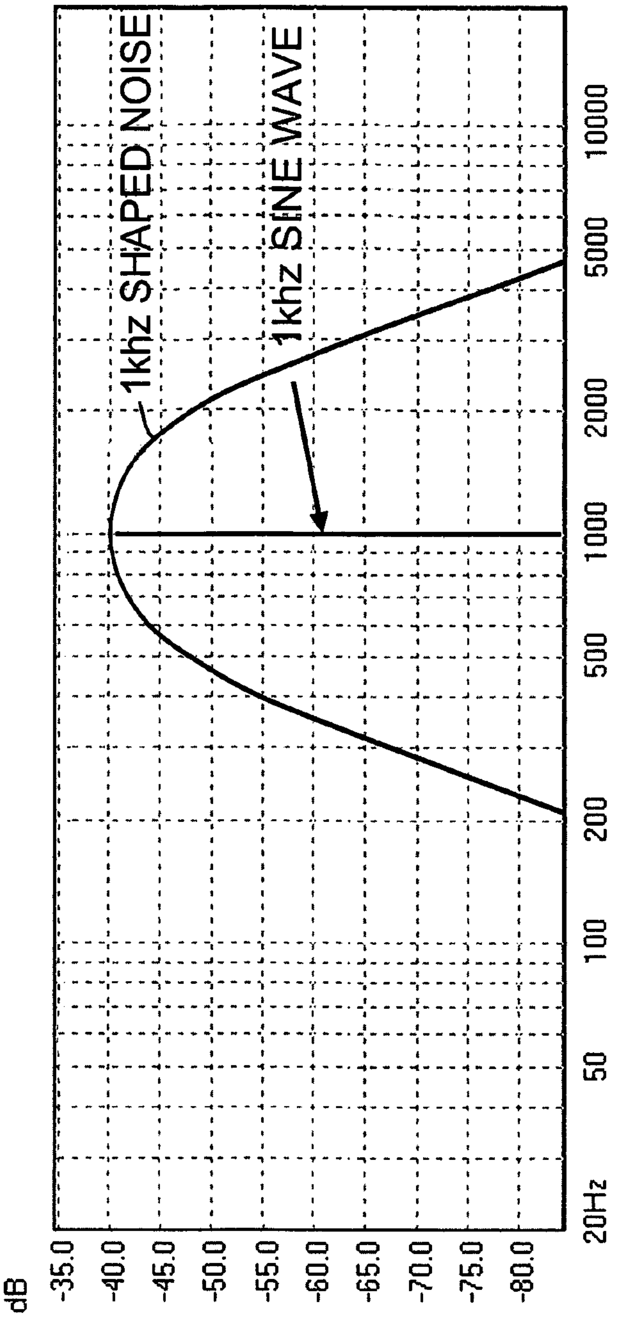
FIG. 7 is a spectral plot of sound levels of noise shaped for use within the broadband in accordance with the invention.

In FIG. 7, a single sine wave at 1 khz is compared with measurement signal using shaped noise with, for example, a center frequency at 1 khz and an upper and lower bandwidth of 1 octave. Using a pure sine wave at 1 khz results in a considerably higher measured loss requiring more correction gain at this frequency than a resulting measurement using the shaped noise stimulus. Therefore, the shaped noise stimulus with a center frequency at the frequency of measurement produces a more meaningful and accurate determination of real world listening.

Other stimuli, such as a tone cluster of multiple frequencies with the dominant frequency at the frequency of measurement, might be used with a broader spectrum of frequencies to produce a similar measurement result. In all cases the resolution of the measurement frequencies is critical to produce an accurate correction response. Such measurements when applied to a correction response will represent normalized hearing at a low sound pressure level.

Accurate Higher Sound Pressure Level Measurement

In addition to low level measurement, a meaningful measurement at a higher sound pressure level is critical to delivering accurate and normalized hearing correction to the user. The second most desirable level for actual measurement is the sound pressure level of typical speech. Therefore, looking at FIG. 8, masking white noise is applied at all frequencies at approximately 60 db SPL to stimulate virtually all frequencies of hearing and allow an accurate measurement of actual hearing at the higher sound pressure level using pure tones. For discussion, measurement frequencies of 100 hz, 1 khz and 10 khz are shown, but many additional frequencies will likely be used to increase the resolution of the measurements and improve the accuracy of the higher level hearing measurement. A pure tone at the measurement frequency with the masking white noise results in an accurate measurement because the white noise is stimulating all frequencies across a large actual measurement range. In a hearing loss situation, the pure tone may become audible at a lower level due to the white noise stimulation in the region of loss.

Other forms of masking, such as bandwidth limited noise centered at the measurement frequency or multiple masking tones near the measurement frequency, can also be used. Other stimuli than pure tones can also be used as long as the dominant frequency is at the measurement frequency of interest. The resulting collected measurement data will provide a real and accurate assessment of the actual measured hearing response at the higher sound pressure level. While the level of speech is considered to be the most common listening level, other sound pressure level measurements can be made if higher sound pressure resolution is desirable, as will be hereinafter discussed in relation to FIG. 12.

Figure 9:
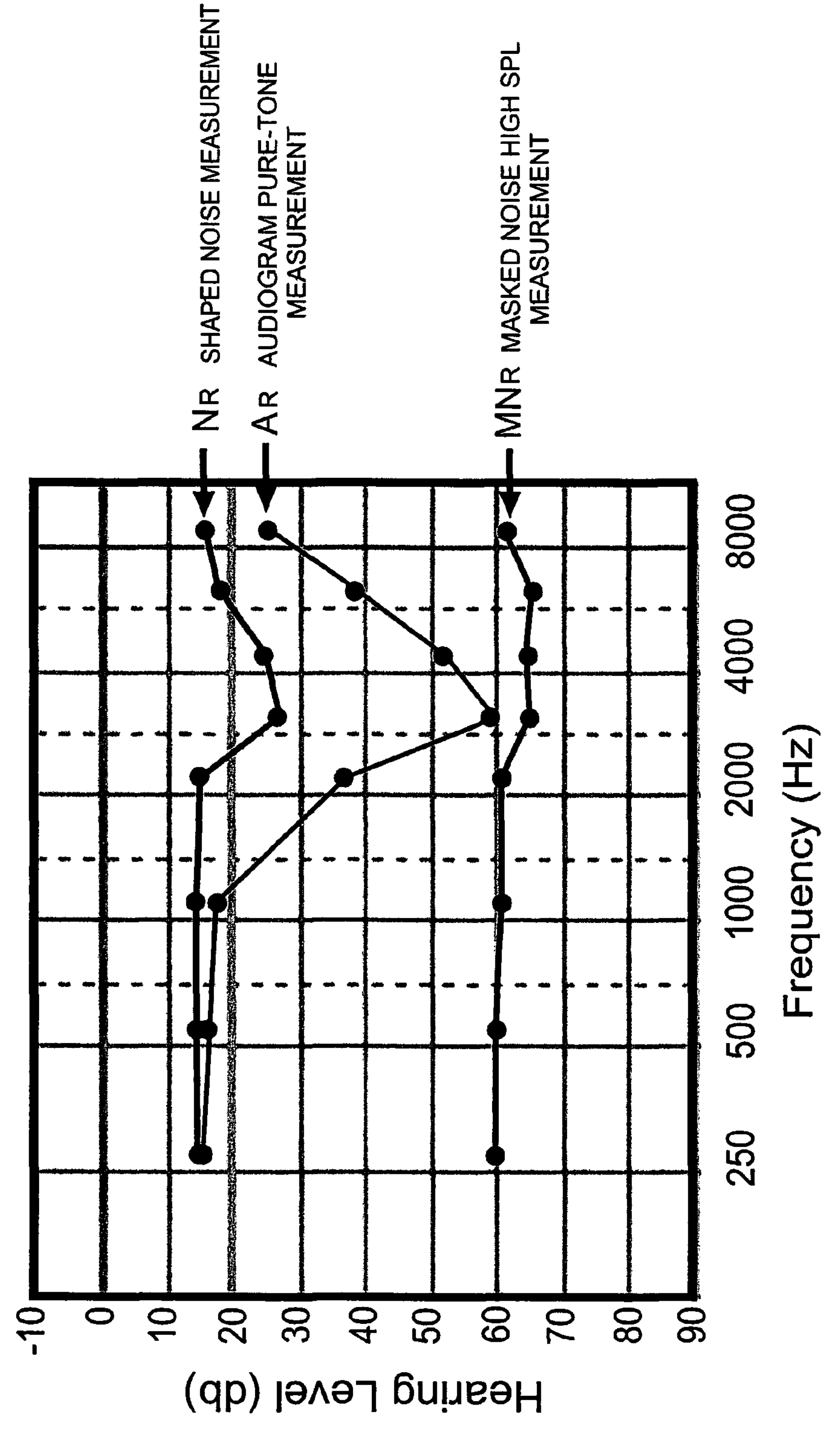
FIG. 9 is a spectral comparison of shaped noise and masked noise measurements for use in accordance with the invention.

FIG. 9 compares the audiogram response $A_R$ of FIG. 4 for a person with hearing loss with the noise response $N_R$ of measurements using shaped noise as hereinbefore described as the stimulus for the measurements. Both responses $A_R$ and $N_R$ use the same data points of 250 hz, 500 hz, 1000 hz, 2000 hz, 3000 hz, 4000 hz, 6000 hz and 8000 hz. There is a large difference in the collected data between these two measurement methods. The shaped noise response $N_R$ provides a far more accurate and normal sounding low sound pressure level correction response than the pure tone response $A_R$. The shaped noise response $N_R$ is also more accurate and normal sounding than a response using the ½ gain rule typically used for adjusting hearing aid low level responses.

Figure 8:
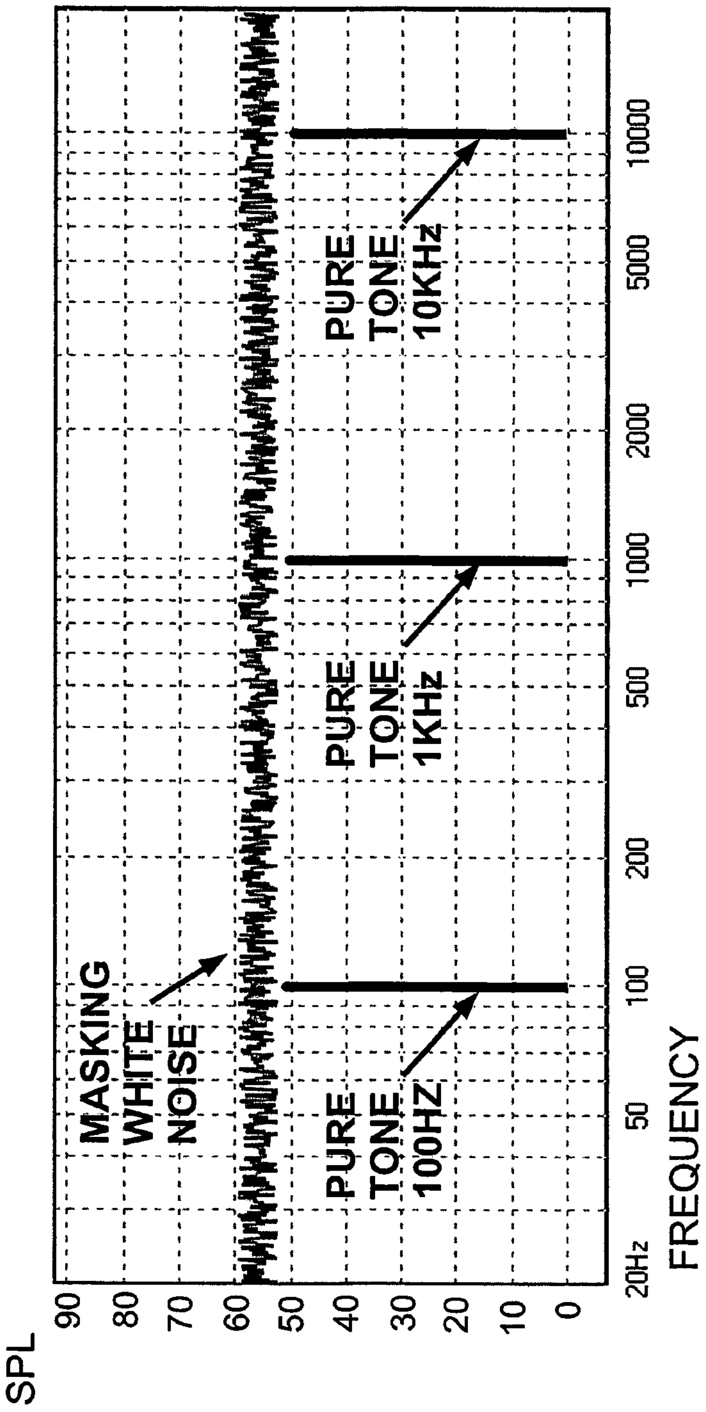
FIG. 8 is a broadband plot illustrating the use of masking white noise in accordance with the invention.

The masked noise response $MN_R$ is the actual measured response using the higher sound pressure level measurement method described with respect to FIG. 8 at the higher sound pressure level of 60 db and can be used to provide the required higher sound pressure level correction response. The normalized system, at a minimum, uses these two measured responses $N_R$ and $MN_R$ to generate two correction response curves to provide the user with accurate corrective hearing response.

Normalized Hearing System Block Diagram

Figure 10:
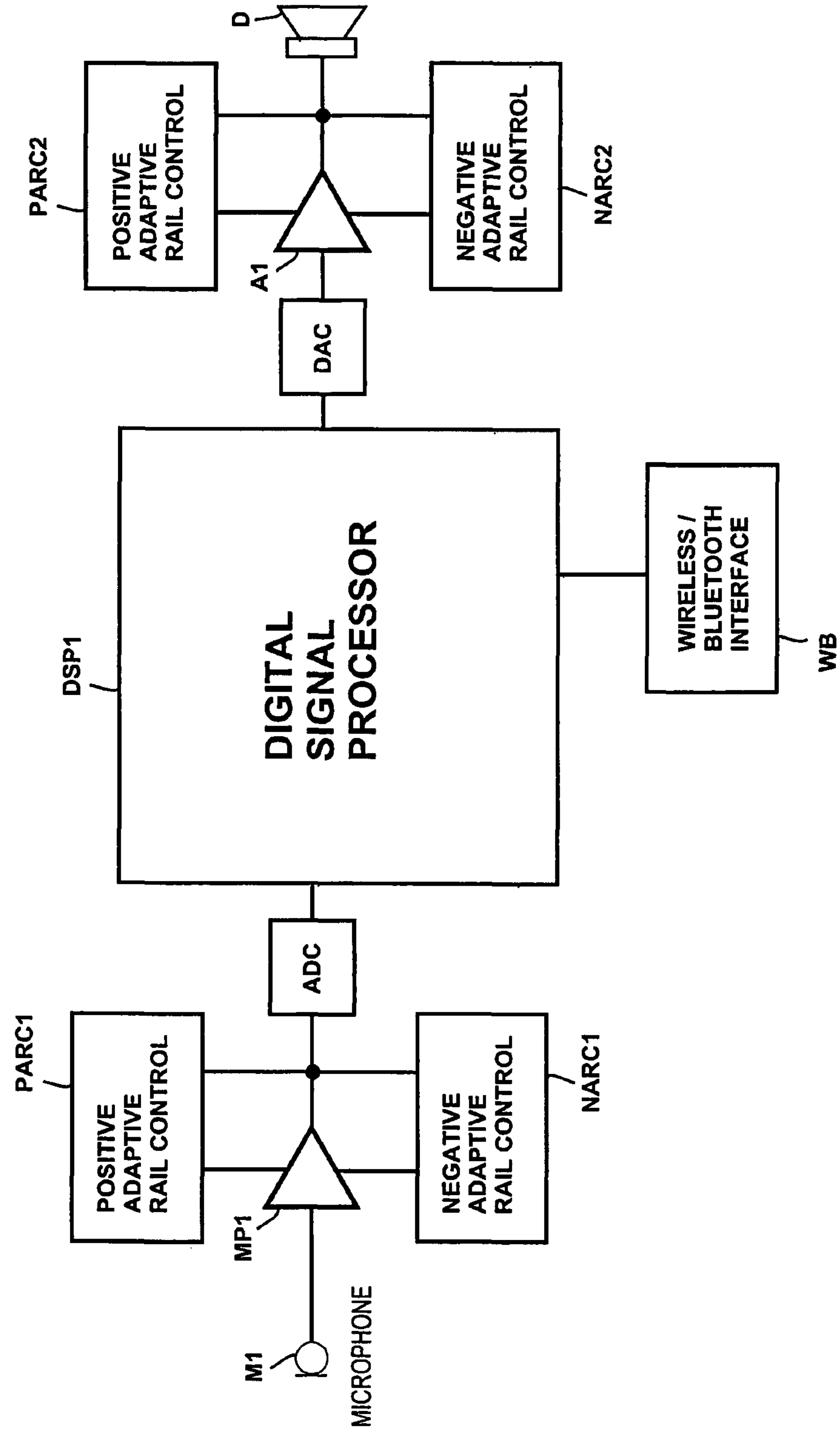
FIG. 10 is a block diagram of a hearing normalization and correction system in accordance with the invention.

Referring to FIG. 10, the main audio processing functions of the normalized hearing system as well as other features such as equalization, compression, limiting, and noise reduction are performed as precision algorithms in the digital signal processing core DSP1. The processing core DSP1 also communicates via a wireless and or Bluetooth interface WB, allowing an external cell phone or computer to control a self-test mode and also to control various user defined settings and adjustments for the system.

The system receives an input signal either from the input microphone M1 or via a direct wireless/Bluetooth interface WB from another transmitting device such as a cell phone or computer (not shown). The microphone M1 feeds a microphone preamplifier MP1 which feeds the input of an analog-to-digital converter ADC. The converter ADC provides a digital output signal to the processing core DSP1. In professional applications where increased headroom is critical, such as professional musical performances, the system may further include positive and negative adaptive rail control circuits PARC1 and NARC1 which operate to allow increased headroom for the microphone input signal if required to avoid clipping or overdriving the input microphone preamplifier MP1.

The output of the processing core DSP1 feeds a digital-to-analog converter DAC which provides an analog output signal to drive an output amplifier A1. The output of the amplifier A1 provides output voltage and current to deliver sound to a driver or acoustical device D. As described above, in professional applications where increased headroom is critical, such as professional musical performances, the system may further include positive and negative adaptive rail control circuits PARC2 and NARC2 which dynamically increase the output headroom of the system to avoid clipping the system. The control circuits PARC2 and NARC2 are identical in operation to PARC1 and NARC1 as described in reference to FIGS. 16, 17 and 18.

The normalized hearing system may operate as a quality hearing normalization system with high precision hearing correction for professional audio applications but can also be used by any user in need of hearing correction. The hearing correction of the invention allows users with mild or moderate hearing loss anomalies to achieve a natural sounding response with both excellent frequency response and dynamic range.

Cross-Fading

Figure 11:
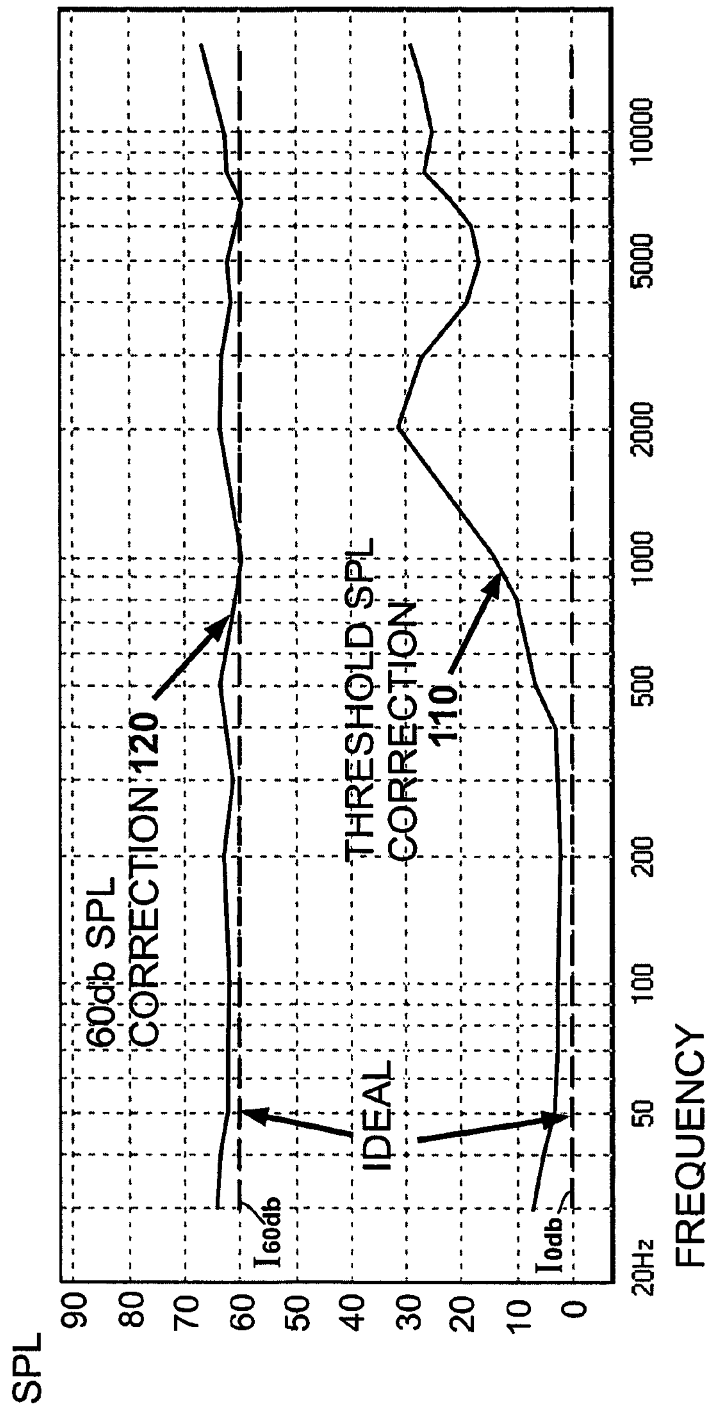
FIG. 11 is a comparison of broadband sound level correction curves in accordance with the invention.

FIG. 11 shows ideal hearing responses $I_{0db}$ and $I_{60db}$ at 0 db SPL and 60 db SPL, respectively, across audio frequencies ranging from 20 Hz to 20,000 Hz. Hearing correction curves 110 and 120 are shown for sound pressure levels from 0 db to 90 db and frequency response from 20 Hz to 20,000 Hz.

The lower threshold SPL correction response curve 110 is based on measurements taken at 0 db SPL using the hereinbefore described shaped noise measurement method converted and applied as the required correction response curve with both higher bandwidth and higher resolution of testing. The higher correction response curve 120 is based on measurements taken at 60 db SPL using the hereinbefore described masking noise measurement method and reflects the correction response required to compensate for any measured hearing deficit. Other correction response curves at other measured sound pressure levels can also be applied if higher resolution testing is performed at additional SPL levels.

The adaptive hearing normalization system operates to dynamically vary between two or more measured response correction curves in correlation to the actual input sound pressure level that appears at the audio input of the hearing normalization system. Correlation relates to the direction of change in sound level and not to its absolute magnitude. Dynamically adaptive operation is required to provide the listener with the most natural sounding audio response and as close to normal hearing as possible. If the threshold of hearing for the listener produces more natural response at low sound pressure levels, the listener will feel as if normal low level hearing is restored.

By dynamically varying between multiple frequency responses at the correct SPL levels based on actual measured data, normal listening can be restored for a user with mild to moderate hearing loss. By increasing the number of response measurements by using masking noise at multiple higher SPL levels, an even more precise restoration of natural hearing response will be achieved for the user. Those with more severe loss will find great improvement when applying the additional higher level correction response curves.

Figure 12:
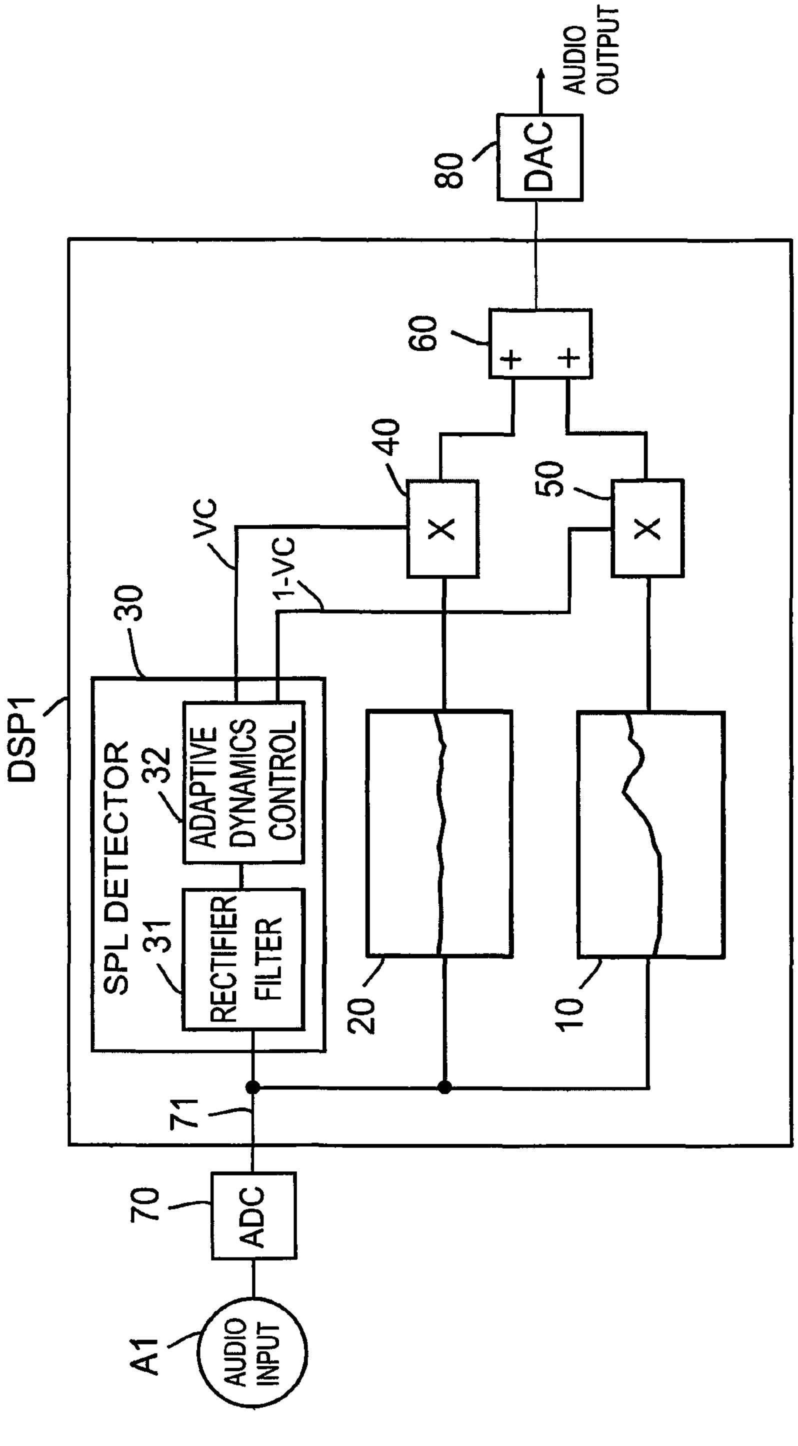
FIG. 12 is a block diagram of the digital signal processor of FIG. 10.

Looking at FIG. 12, the signal processor DSP1 produces the dynamic operation of the hearing normalization system and also provides hearing correction based on actual measured data. An audio input signal, typically the output of a microphone preamplifier or wired connection if the hearing normalization is being used by a musician while performing, is applied as the audio input A1 to an analog-to-digital converter ADC 70.

The digital output signal from the converter ADC 70 is applied to corrective filters 10 and 20 and to the SPL detector 30. One filter 10 applies corrective equalization based on the low sound pressure level measurements and the other filter 20 applies corrective equalization based on the higher 60 db SPL measurements. The outputs of the corrective filters 10 and 20 are applied to the inputs of multipliers 40 and 50, respectively. Even higher performance is possible by applying cross-fade in multiple frequency bands. The multiple correction curve filters can also be applied as multiple frequency band filters by dividing the audio spectrum into multiple frequency bands and applying the required low level and higher level gain at the required frequency points within in each frequency band. Separate level detectors and adaptive dynamics control would also be required for each frequency band.

The corrective filters 10 and 20 can be implemented with Infinite Impulse Response (IIR) or Finite Impulse Response (FIR) techniques. The filter coefficients can be calculated from the measured sound pressure level data using a number of methods documented in DSP literature, including Inverse FFT, fast convolution via FFT and Least Squares techniques.

The output levels of the multipliers 40 and 50 are controlled by the SPL detector 30 which provides a level control based on the actual sound pressure level of the audio at the audio input of the signal processor DSP1. When the SPL level at the audio input A1 is below 10 db SPL, the higher level multiplier 40 will be at a gain of 0 and the low level multiplier 50 will be at a gain of 1. As the input audio level increases above 10 db SPL the low level multiplier 50 will start to attenuate and the output of the higher level multiplier 40 will begin to increase. When the audio input level reaches 60 db SPL the low level multiplier 50 will be at a gain of 0 and the higher level multiplier 40 will be at a gain of 1. The outputs of the multiplier 40 and 50 are applied to the inputs of a summer 60. The output of the summer 60 is applied to the input of a digital-to-analog converter 80 which provides the audio output signal of signal processor DSP1. The audio output signal of the digital-to-analog convertor DAC 80 will be applied to an audio amplifier (not shown) which drives an acoustical device to provide sound to the ear of the user.

As hereinbefore discussed, additional correction filters can be added based on additional SPL measurement levels. If additional correction filters are used the SPL detector 30 will provide the control signal for the additional multipliers and cross-fade operation between the additional corrective filter outputs will be provided producing further enhanced operation.

The dynamic cross-fade operation between the corrective response curves can also be applied in multi-band operation with cross-fade in multiple bands between actual measured SPL levels. In the multiband approach, unlike prior art multiband compression systems, the actual required output level at different sound pressure levels of each band is applied based on actual measurements. Each frequency band would then dynamically vary or cross-fade between the two or more corrective response curves as determined by actual measurements. The multiband aspect of the invention does not use normal compression but rather a dynamic cross-fade. The dynamic cross-fade method can also actually provide improved speech articulation by increasing formant perception.

Dynamics Processing

Figure 13:
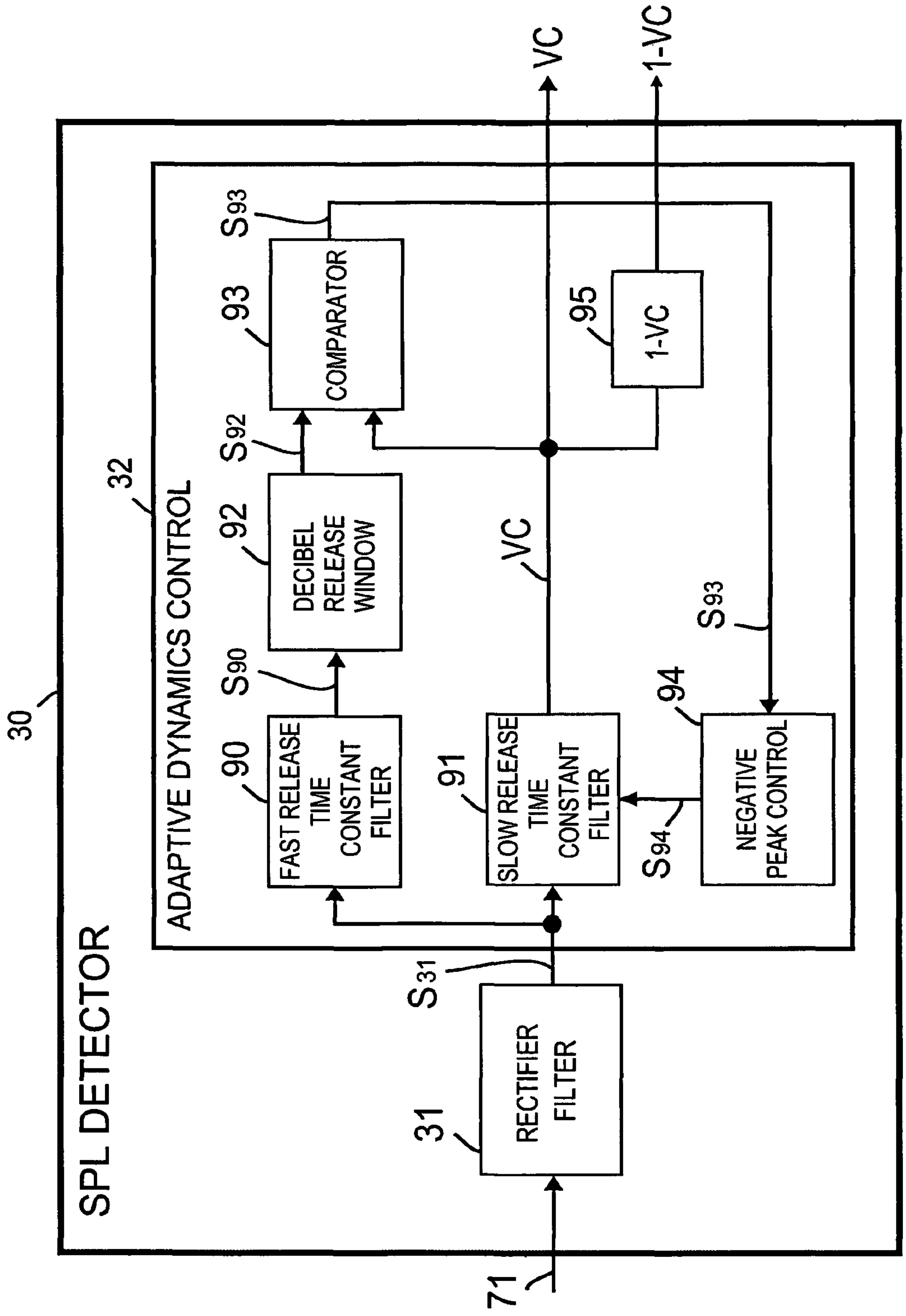
FIG. 13 is a block diagram of the adaptive dynamics control of the digital signal processor of FIG. 12.

Turning to FIG. 13, the SPL detector 30 of FIG. 12 contributes significantly to the transparency of the hearing normalization system. A rectifier filter 31 receives the output signal 71 of the analog-to-digital converter 70 as seen in FIG. 12. Returning to FIG. 13, The rectifier filter 31 full-wave rectifies the output signal 71 and incorporates averaging and filtering to provide a very fast attack and release response. This fast response becomes the fast attack time of the system. The output signal S31 of the rectifier filter 31 feeds the input of a fast release time constant filter 90 and a slow release time constant filter 91.

The output signal VC of the slow release time constant filter 91 feeds a comparator 93 and a subtractor 95. The output signal VC is also a first output control voltage of the SPL detector 30. The subtractor 95 performs a mathematical function producing an output signal 1-VC to provide a second output signal of the SPL detector 30. The two control signals are applied to the gain multipliers 40 and 50 seen in FIG. 12, providing the cross-fade operation of the hearing normalization system.

Returning to FIG. 13, the output signal S90 of the fast release time constant filter 90 feeds the input of a decibel release window 92 which determines the maximum decibel difference between the fast release time constant signal S90 and the slow time constant signal VC. The output signal S92 of the decibel release window 92 feeds one input of a comparator 93 and the output signal VC feeds the other.

Figure 14:
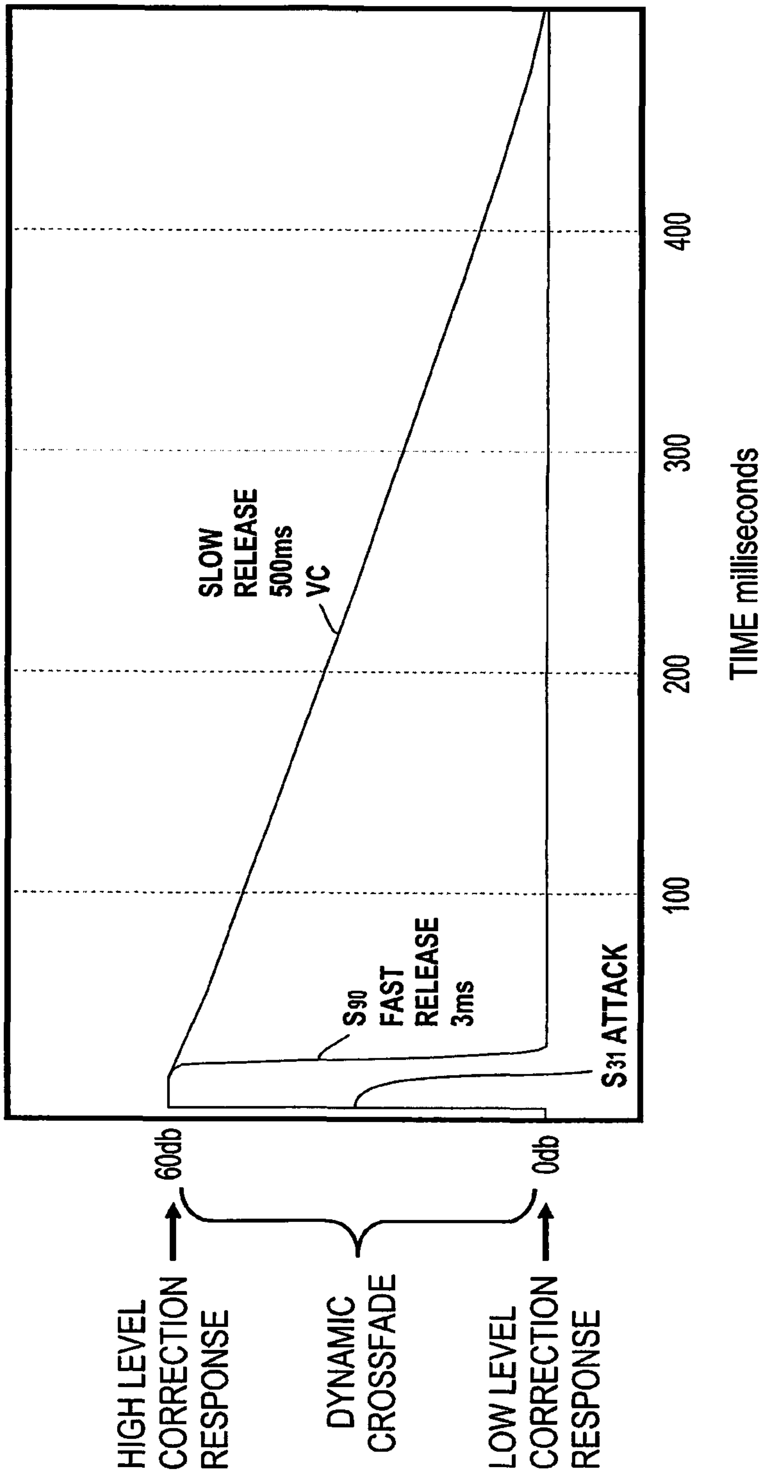
FIG. 14 illustrates the dynamic response characteristics of the adaptive dynamics control of the digital signal processor of FIG. 12.

The output signal S93 of the comparator 93 feeds the input of a negative peak control 94 and the output signal S94 of negative peak control 94 feeds the slow-release-time constant filter 91. In operation, the fast response rectifier filter 31 determines the maximum attack time of the SPL detector 30 and feeds both fast and slow time constant filters 90 and 91, respectively. A sudden loud audio input signal will produce a fast attack response as shown in FIG. 14. Returning to FIG. 13, a sudden large drop in the sound pressure level of the audio input will be closely tracked by the fast-release time constant filter 90 and the output of the slow-time constant filter 91 will start to decrease at a considerably slower rate. The comparator 93 compares the difference between the slow-time constant filter 91 and the fast-time constant filter 90 that is being fed through the decibel release window 92. The decibel release window is typically set for a 6 db difference between the fast release input signal S90 and output signal S92. This requires the fast release output signal S90 to drop by 6 db before the comparator 93 activates the negative peak control 94. The negative peak control 94 will instantly alter the slow release time constant to be at the same negative peak as the fast time constant.

If the input signal drops quickly and over a large decibel range, the output control signals VC and 1-VC will provide a release response equal to the fast release time constant filter 90. If the input audio signal drops extremely slow, the difference between the slow release response filter output signal VC and the decibel release window output signal S92 will never exceed the 6 db window, so the slow release response VC will remain as the output response VC. This ensures that the slow decaying audio input signal will be processed by the slow release response and maintain ripple free release without any gain modulation during the cross-fade operation. Input audio signals with a moderately fast decaying envelope will produce an output time constant that tracks the actual envelope of the input audio. The tracking is due to the interaction of the decibel release window 92, the comparator 93 and the negative peak control 94 to increase the negative peak of the slow release time constant filter 91.

Due to the operation of the decibel release window 92, once the slow time constant negative peak is equal to the fast time constant, the slow release time constant becomes dominant. Therefore, only negative going peaks and not control signal ripple in the fast release time constant will affect the slow release, eliminating ripple that would otherwise occur in the control signal VC. This allows extremely fast release response without the associated gain modulation.

FIG. 14 illustrates the dynamic response characteristics of the adaptive dynamics control. The fast attack time response S31 at the output of the rectifier filter 31 has a nearly instantaneous response between 0 db and 60 db. The fast release signal S90 that appears at the output of the fast release time constant filter 90 may provide a release time as fast as 3 ms. The slow release signal VC appears at the output of the slow release time constant filter 91. The adaptive dynamics control will track the actual envelope of the incoming audio signal and provide an adaptive, ripple free, smooth release response that avoids gain modulation that would otherwise cause pumping and breathing artifacts in the processed audio. The low level correction response is at 0 db, the high level correction response is at 60 db and the system dynamically cross-fades between the low level correction response and high level correction response. A sudden large increase in input sound pressure level will instantly vary the response from the low level correction to the high level correction. The fast attack time response S31 at the output of the rectifier filter 31 has with a nearly instantaneous response between 0 db and 60 db. The audio signal path in the DSP processor can be delayed by as little as 0.5 milliseconds which, combined with the fast attack time, eliminates any possible overshoot. This delivers output audio more representative of how a person with normal hearing would hear a sudden increase in sound.

The release time required to return to the low level correction response is adaptive and will be based on the short term envelope of the audio input signal. If the sound pressure level drops quickly, the release response will track the input audio's envelope. The fast release signal S90 at the output of the fast release time constant filter 90 is provides a release time as fast as 3 ms. The slow release signal VC at the output of the slow release time constant filter 91 can be as much as 500 ms or more. The adaptive dynamics control will track the actual envelope of the incoming audio signal and provide an adaptive ripple free, smooth release response that avoids gain modulation that causes pumping and breathing artifacts in the processed audio. This is especially helpful when the user is in a loud environment where the sound pressure levels are changing quickly.

The release response can adapt over a ratio greater than 150:1 compared to the 8:1 adaptive release response of multiband compression systems. The dynamic response combined with the cross-fade operation affords an extremely adaptive and transparent hearing normalization system.

Automatic Tuning

Figure 15:
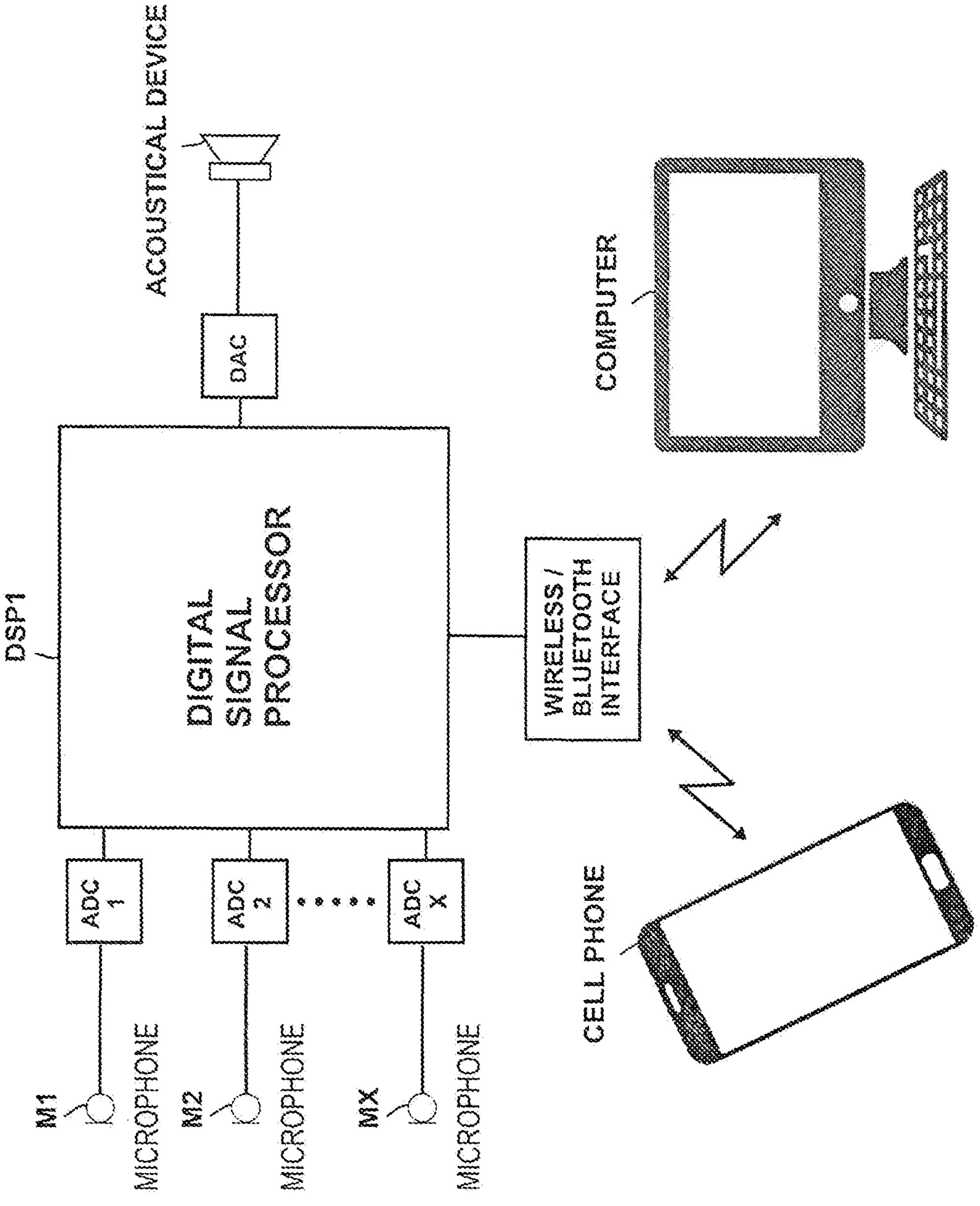
FIG. 15 is a block diagram of hearing normalization and correction system with peripherals.

Looking at FIG. 15, the operational signal processing aspects of the invention are implemented in the digital signal processor DSP1. The processor DSP1 receives an audio input signal from a microphone M1. Additional microphones may be used to provide other features such as noise reduction based on arrival time between two or more microphones. The processor DSP1 receives control information from either a cell phone or computer to initiate the measurement mode of operation, including all sound pressure levels of testing. The measurement stimulus can be generated internally in the processor DSP1 or may be sent via wireless or Bluetooth from an external cell phone or computer. The measured data may be collected and stored in either the memory of the processor DSP1 or the external cell phone or computer.

Once the measurement data is collected at the various sound pressure levels and stored in memory, the automatic tuning operation will be available to the user. Selecting the automatic tuning operation will initiate a process whereby the cell phone, computer or DSP processor will use the stored measured response data to calculate and determine proper filter coefficients required to produce the multiple correction response curves. The filter coefficients are applied within the DSP processor to produce accurate correction response curves at the multiple sound pressure levels as illustrated in FIG. 11. The processor DSP1 applies the dynamic correction response to the digital signal fed to the digital-to-analog converter DAC to produce an audio output which is applied to an acoustical device. Audio signals can also be sent to the processor DSP1 via the wireless or Bluetooth interface, allowing phone calls and other desirable audio signals to be processed from this interface.

Enhanced Dynamic Headroom

Typical hearing aid and personal listening devices operate on batteries. Operating at lower voltages could increase operating time and the current available to power the device, but the lower the voltage the less the available voltage swing and headroom for both the input signal and to drive the output speaker. A response even close to that of a person with normal hearing requires a hearing normalization system operating with high dynamic range.

Figure 16:
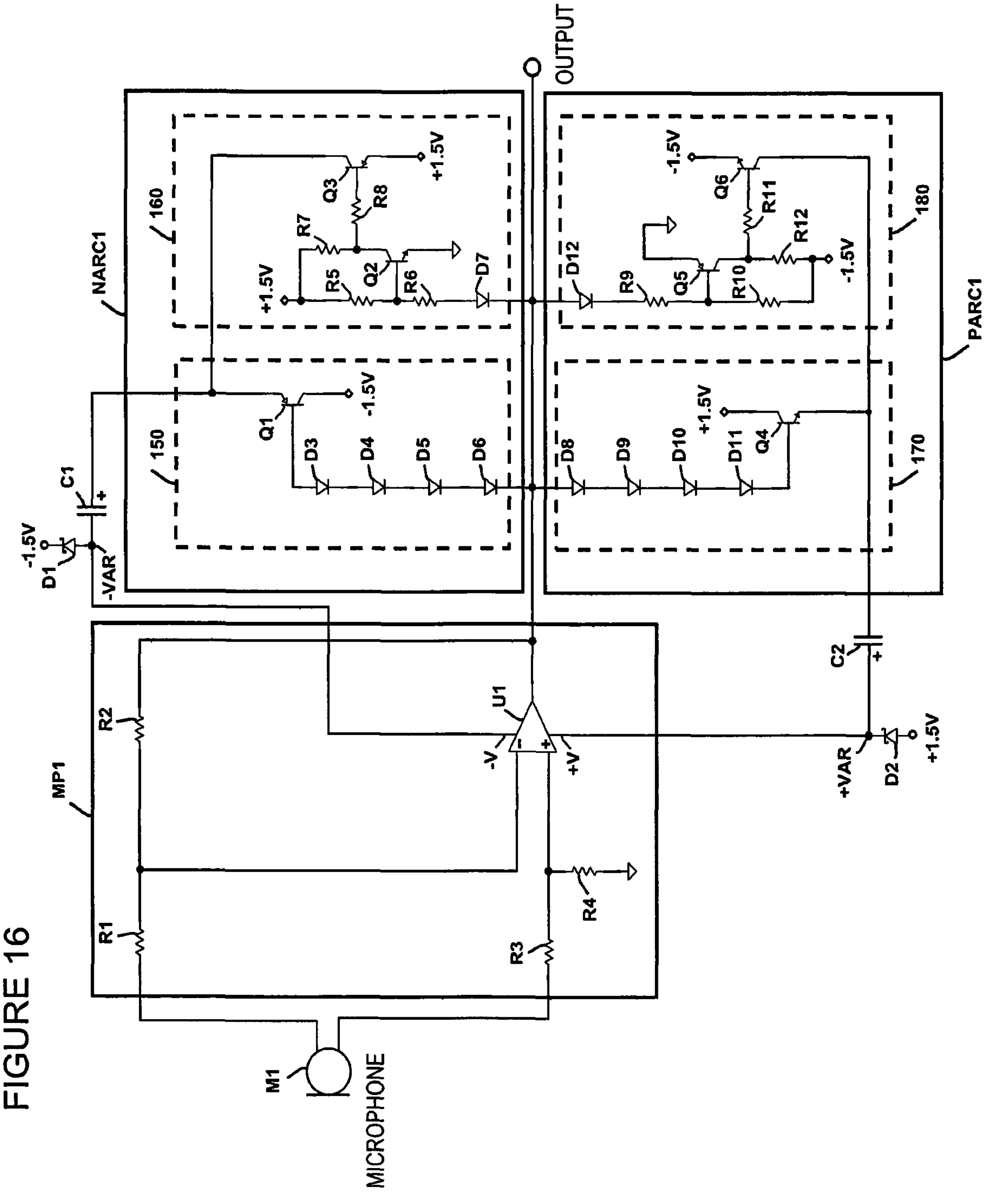
FIG. 16 is a schematic diagram of a dynamically adaptive microphone preamplifier in accordance with the invention.

Look now at FIG. 16. Additional gain boost is applied after the output of the microphone preamplifier U1. Therefore, in order to avoid noise intrusion when listening at threshold of hearing, it is critical that low noise appear at the output of the microphone preamplifier U1. In order to facilitate normalized hearing at very high SPL levels, it is also critical to assure operation without overloading or distorting the input microphone electronics. Preferably, as explained in relation to FIGS. 16-18, the microphone preamplifier circuit of the hearing normalization system will be able to accept high SPL levels with dynamic operation by adaptively increasing the available power supply voltage used to power the microphone preamplifier.

Figure 17:
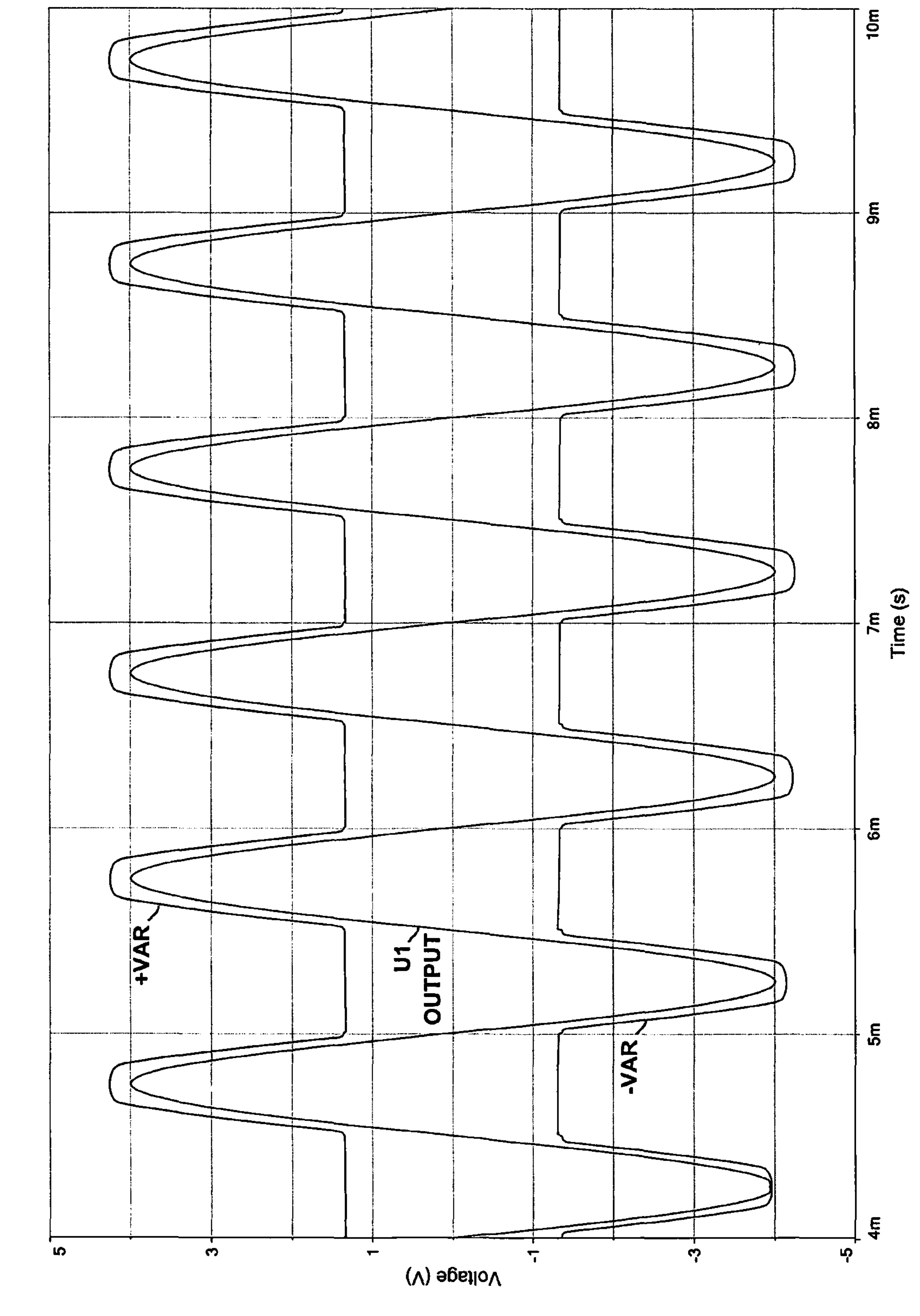
FIG. 17 is a plot of the output swing of the preamplifier of FIG. 16.

Looking again at FIG. 16, a dynamically adaptive microphone preamplifier MP1 has audio tracking power supply rails PARC1 and PARC 2 as best seen in FIG. 17. Returning to FIG. 16, a low voltage low noise operational amplifier U1 is used as a differential microphone preamplifier. The amplifier U1 and the resistors R1, R2, R3 and R4 form a standard differential amplifier circuit with a typical gain of greater than 20 db. The positive power supply pin +V is connected to the cathode side of schottkey diode D2. The anode side of schottkey diode D2 is connected to the +1.5 volt power supply rail. The positive side of a capacitor C2 is connected to the positive power supply pin +V and this node becomes the variable positive power supply rail +VAR. The negative side of the capacitor C2 is connected to the output of positive rail charge circuit 40 and a positive rail boost circuit 30. In operation, when the output of the microphone preamplifier U1 is at zero volts, the positive rail charge circuit 40 is active.

The emitter of a transistor Q5 is connected to ground and a resistor R12 is connected between the −1.5 volt power supply rail and the collector of the transistor Q5. A resistor R10 is connected to the −1.5 volt power supply rail and the base of the transistor Q5. Another resistor R9 is connected between the base of the transistor Q5 and the cathode side of a diode D12. The anode side of the diode D12 is connected to the output of the microphone preamplifier U1. The values of resistors R9 and R10 are selected to bias the switching transistor Q5 on when the output of the microphone preamplifier U1 is below positive 0.3 volts. When the switching transistor Q5 is switched on, the collector of the switching transistor Q5 will be at ground. When the collector of the switching transistor Q5 is switched to ground, the transistor Q6 is switched on, connecting the negative side of the capacitor C2 to the −1.5 voltage rail. This will charge the capacitor C2 across the +1.5 volt power supply rail and the −1.5 volt power supply rail. Therefore, the capacitor C2 will be charged to 3 volts. When the output of the microphone preamplifier U1 swings positive by more than 0.3 volts, the switching transistor Q5 turns off and the base of the transistor Q6 will be pulled to the −1.5 volt rail through the base resistor R11 and the resistor R12, switching off the transistor Q6, so the transistor Q6 is now open collector.

As the output of the microphone preamplifier U1 swings positive by more than 0.4 volts, a rail boost transistor Q4 becomes active. The collector of the rail boost transistor Q4 is connected to the +1.5 volt power supply rail. The emitter of the rail boost transistor Q4 is connected to the negative side of the capacitor C2. The base of the rail boost transistor Q4 is connected to the output of the microphone preamplifier U1 through series connected diodes D8, D9, D10 and D11 with the cathode side of the diode D11 connected to the base of the rail boost transistor Q4 and the anode side of the diode D8 connected to the output of the microphone preamplifier U1. The rail boost transistor Q4 operates as an emitter follower with a negative offset based on the forward diode drop of the diodes D8, D9, D10 and D11 plus the VBE drop of the rail boost transistor Q4. As the output of the microphone preamplifier U1 increases above approximately positive 0.4 volts the emitter voltage of the rail boost transistor Q4 starts to increase linearly above the −1.5 volt power supply rail to which the negative side of the capacitor C2 has been charged. This increases the voltage on the negative side of the capacitor C2 which then increases the voltage at the positive power supply pin of the microphone preamplifier U1. This voltage increase will track the audio input signal and continue until the output of the microphone preamplifier U1 exceeds 4 volts. The output will saturate at approximately 4.2 volts. This allows the output of the microphone preamplifier U1 to swing between positive 4.2 volts and negative 4.2 volts when the negative boost rail 150 operates.

This provides headroom for the microphone preamplifier U1 equal to that of an 8.4 volt battery, well above what would be normal with a 3 volt battery. This also provides an increase of nearly 3 times the available output voltage swing before clipping. The increased positive voltage is available due to the charge held in the capacitor C2. The circuit operates like a charge pump circuit controlled by the audio output signal. A slight voltage drop will result from the current pulled by the operation of the microphone preamplifier U1. This slight discharge will be replenished as the output voltage swing of the microphone preamplifier U1 drops below 0.3 volts, thereby turning on the positive rail charge circuit 40. A capacitor C1 and the capacitor C2 are selected to provide minimal discharge at very low frequency operation in order to avoid voltage sag of the +VAR peak voltage. Without the dynamic operation of the microphone preamplifier U1, the normal output swing would be +/−1.5 volts for a total voltage swing of 3 volts. The forward voltage drop of the schottky diodes D1 and D2 becomes a limiting factor at lower voltages. A full 3 times increase in headroom would be possible with ideal diodes for D1 and D2. If very low battery voltage is used, critical selection of the diodes D1 and D2 is required to provide the lowest possible forward voltage drop. Referring to FIG. 17, the output voltage swing of the microphone preamplifier U1 is shown with the variable adaptive power supply rails +VAR and −VAR. With a pure sine wave input signal, it can be seen that as the output voltage of the microphone preamplifier U1 increases above approximately 0.4 volts, the positive power supply +VAR starts to increase providing increased headroom for the output voltage swing of the microphone preamplifier U1.

Returning to FIG. 16, the negative power supply pin −V is connected to the anode side of the schottkey diode D1. The cathode side of schottkey diode D1 is connected to the −1.5 volt power supply rail. The negative side of the capacitor C1 is connected to the negative power supply pin −V. This node becomes the variable negative power supply rail −VAR. The positive side of the capacitor C1 is connected to the output of negative rail charge circuit 20 and negative rail boost circuit 10. In operation, when the output of the microphone preamplifier U1 is at zero volts, negative rail charge circuit 20 is active.

The emitter of the transistor Q2 is connected to ground and a resistor R7 is connected between the +1.5 volt power supply rail and the collector of the Q2. A resistor R5 is connected to the +1.5 volt power supply rail and the base of the transistor Q2. A resistor R6 is connected between the base of the transistor Q2 and the anode of a diode D7. The cathode of the diode D7 is connected to the output of the microphone preamplifier U1. The value of resistors R5 and R6 are selected to bias the switching transistor Q2 on when the output of U1 is above negative 0.3 volts. When switching transistor Q2 is switched on, the collector of the transistor Q2 will be at ground. When the collector of the transistor Q2 is switched to ground a transistor Q3 is switched on, connecting the positive side of the capacitor C1 to the +1.5 voltage rail. This will charge the capacitor C1 across the +1.5 volt power supply rail and the −1.5 volt power supply rail. This means that the capacitor C1 will now be charged to 3 volts. When the output of U1 swings negative by more than 0.3 volts, the switching transistor Q2 turns off and the base of the transistor Q3, through a base resistor R8, will be pulled to the +1.5 volt rail by another resistor R7, switching off the transistor Q3, so the transistor Q3 is now open collector.

As the output of the microphone preamplifier U1 swings negative by more than 0.4 volts, the rail boost transistor Q1 becomes active. The collector of Q1 is connected to −1.5 volt power supply rail, the emitter of Q1 is connected to the positive side of the capacitor C1 and the base of Q1 is connected to the output of the microphone preamplifier U1 through series connected diodes D3, D4, D5 and D6 with the anode side of the diode D3 connected to the base of transistor Q1 and the cathode of the diode D6 connected to the output of the microphone preamplifier U1. The transistor Q1 operates as an emitter follower with a positive offset based on the forward diode drop of diodes D3, D4, D5 and D6 plus the VBE drop of the transistor Q1. As the output of the microphone preamplifier U1 decreases below approximately negative 0.4 volts, the emitter voltage of transistor Q1 starts to decrease linearly below the +1.5 volt power supply rail to which the positive side of the capacitor C1 has been charged. This increases the voltage on the positive side of the capacitor C1 which then increases the negative voltage at the negative power supply pin −V of the microphone preamplifier U1. This negative voltage increase will track the audio input signal and continue until the output of the microphone preamplifier U1 exceeds −4 volts. The output will saturate at approximately −4.2 volts. The increased voltage is available due to the charge held in the capacitor C1.

As noted above, the circuit operates like a charge pump circuit controlled by the audio output signal. A slight voltage drop of the capacitor C1 will result from the current pulled by the operation of the microphone preamplifier U1. This slight discharge will be replenished as the output voltage swing of the microphone preamplifier U1 goes above negative 0.3 volts, thereby turning on negative rail charge circuit 20. The capacitors C1 and C2 are selected to provide minimal discharge at very low frequency operation in order to avoid voltage sag of the +VAR peak voltage. Without the dynamic operation of the microphone preamplifier U1, the normal output swing would be +/−1.5 volts for a total voltage swing of 3 volts. Referring again to FIG. 17, as the output voltage of the microphone preamplifier U1 swings below approximately −0.4 volts, the negative power supply −VAR starts to swing below the fixed negative rail providing increased headroom for the negative output voltage swing of the microphone preamplifier U1.

Also critical for normalized hearing is the dynamic range of the amplifier driving the acoustical device, which delivers sound to the ear. This becomes critical for the professional musician since stage sound pressure levels can be quite high and the output level required will be higher than nominal listening levels. There will also be times where the non-musician user may require higher output levels without distortion, especially critical to handle transients without clipping. While one of the available user selectable audio functions will be compression or limiting, thereby allowing the user to reduce the output level in loud environments, the ability to handle momentary loud levels is critical for providing a normal hearing response. The same method of increasing the available headroom for the microphone preamplifier is also used to increase the headroom of the output amplifier.

Figure 18:
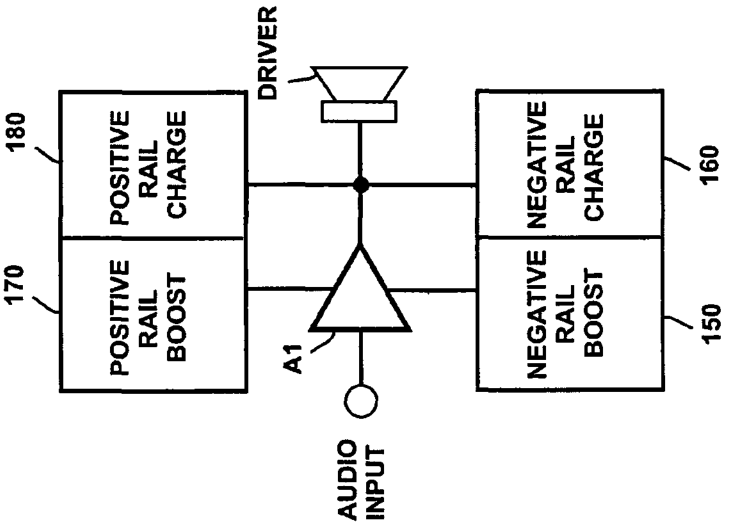
FIG. 18 is a block diagram of the output amplifier portion of the hearing correction system.

The dynamic headroom circuitry shown in FIG. 16 can also be used to enhance the dynamic range of the amplifier circuit powering the speaker driver for the ear. FIG. 18 shows a simplified block diagram of the output amplifier section of the hearing normalization with enhanced dynamic range operation. The positive and negative rail charge and rail boost circuits are the same as disclosed in FIG. 11 with only one required change. The storage capacitors C1 and C2 need to be larger in value to handle the increased current demand when driving a typical 32 ohm speaker in the hearing normalization system. The increased capacitance is required to avoid voltage sag and low frequencies. The required capacitance increase is on the order of a 10 times that of the capacitors C1 and C2 required for the microphone preamplifier U1.

Alternatively, the dynamic correction response could be achieved using multiple frequency filters be implemented as either state variable filters or fixed bandwidth filters, similar to a graphic equalizer, dynamically varying the output level of the filters in correlation to the input sound pressure level to produce the required correction at the different sound pressure levels. This could be implemented in either analog or digital form.

Thus, it is apparent that there has been provided, in accordance with the invention, a hearing normalization and correction system that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and additions as fall within the spirit of the appended claims.

What is claimed is:

1. A process for delivering to the ear of a user of an acoustical device an accurate hearing response to an input audio signal, the process comprising the steps of:

modifying the audio input signal by a first correction response based on the actual hearing response of the user at a first sound pressure level to produce a first correction level response;

modifying the audio input signal by a second correction response based on the actual hearing response of the user at a second sound pressure level higher than the first sound pressure level to produce a second correction level response;

applying the first correction level response to the output signal of the acoustical device when the sound pressure of the audio input signal is at the first sound pressure level;

applying the second correction level response to the output signal of the acoustical device when the sound pressure of the audio input signal is at the second sound pressure level; and when the sound pressure of the audio input signal is between the first and second sound pressure levels, dynamically varying the output signal between the first correction level response and the second correction level response in correlation with the varying sound pressure level of the input audio signal.

2. A process according to claim 1, the second sound pressure level of the input audio signal being a normal conversational speech level of hearing.

3. A process according to claim 1, further comprising the steps of:

modifying the audio input signal by a third correction response based on the actual hearing response of the user at a third sound pressure level higher than the first sound pressure level to produce a third correction level response;

applying the third correction level response to the output signal of the acoustical device when the sound pressure of the audio input signal is at the third sound pressure level; and when the sound pressure of the audio input signal is between the second and third sound pressure levels, dynamically varying the output signal of the acoustical device between the second correction level response and the third correction level response in correlation with the varying sound pressure level of the input audio signal.

4. A process according to claim 3 further comprising the steps of:

modifying the audio input signal by additional correction level responses based on the actual hearing responses of the user at corresponding additional sound pressure levels sequentially increasingly higher than the third actual hearing response of the user to produce additional corresponding correction level responses;

applying each additional corresponding correction level response to the output signal of the acoustical device when the sound pressure of the audio input signal is at the additional corresponding sound pressure level; and when the sound pressure of the audio input signal is between additional corresponding sequential sound pressure levels, dynamically varying the output signal of the acoustical device in correlation with the varying sound pressure level of the input audio signal.

5. A process according to claim 1 further comprising the steps of:

dividing the spectrum of the audio input signal into multiple frequency bands; and repeating the steps of claim 1 for each of the multiple frequency bands.

6. A process according to claim 1, the steps of modifying the audio input signal at the first and second sound pressure levels comprising the sub-steps of:

measuring first and second actual hearing responses of the user at the first and second sound pressure levels of the input audio signal, respectively, and converting the measured first and second actual hearing responses into the first and second correction level responses, respectively.

7. A process according to claim 6, the second sound pressure level of the input audio signal being a normal conversational speech level of hearing.

8. A process according to claim 6, further comprising the steps of:

measuring a third actual hearing response of the user at a third sound pressure level higher than the second sound pressure level;

converting the measured third actual hearing response into a third correction level response;

applying the third correction level response to the output signal of the acoustical device when the sound pressure of the audio input signal level is at the third sound pressure level; and when the sound pressure of the audio input signal is between the second and third sound pressure levels, dynamically varying the output signal of the acoustical device between the second correction level response and the third correction level response in correlation with the varying sound pressure level of the input audio signal.

9. A process according to claim 8, further comprising the steps of:

measuring additional actual hearing responses of the user at corresponding sound pressure levels sequentially increasingly higher than the third actual hearing response of the user;

converting each additional measured actual hearing response into an additional corresponding correction level response;

applying the corresponding additional correction level response to the output signal of the acoustical device when the sound pressure level of the audio input signal is at the additional corresponding sound pressure level; and when the sound pressure of the audio input signal is between sequential additional sound pressure levels, dynamically varying the output signal of the acoustical device between corresponding sequential correction level responses in correlation with the varying sound pressure level of the input audio signal.

10. A process according to claim 6 further comprising the steps of:

dividing the spectrum of the audio input signal into multiple frequency bands; and repeating the steps of claim 1 for each of the multiple frequency bands.

* * * * *